US010075459B1

(12) United States Patent
Suryanarayanan et al.

(10) Patent No.: US 10,075,459 B1
(45) Date of Patent: Sep. 11, 2018

(54) SECURING WORKSPACES IN A CLOUD COMPUTING ENVIRONMENT

(71) Applicant: .Amazon Technologies, Inc., Reno, NV (US)

(72) Inventors: Deepak Suryanarayanan, Seattle, WA (US); Colin Harrison Brace, Mercer Island, WA (US); Malcolm Russell Ah Kun, Bellevue, WA (US); Osman Surkatty, Seattle, WA (US); Supreeth Koushik Sheshadri, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 148 days.

(21) Appl. No.: 14/161,428

(22) Filed: Jan. 22, 2014

(51) Int. Cl.
 *H04L 29/06* (2006.01)

(52) U.S. Cl.
 CPC ...... *H04L 63/1425* (2013.01); *H04L 63/1416* (2013.01)

(58) Field of Classification Search
 CPC .................................................. H04L 63/1425
 See application file for complete search history.

(56) References Cited

U.S. PATENT DOCUMENTS

| | | | | |
|---|---|---|---|---|
| 7,912,955 B1 * | 3/2011 | Machiraju | ............. | G06F 9/5077 709/221 |
| 8,443,367 B1 * | 5/2013 | Taylor | ....................... | G06F 9/52 718/1 |
| 8,701,174 B1 * | 4/2014 | Dotan | ................... | H04L 9/3228 709/203 |
| 9,210,079 B2 * | 12/2015 | Sridhar | ................... | H04L 45/74 |
| 9,426,155 B2 * | 8/2016 | Chao | ....................... | H04L 63/10 |
| 2007/0018992 A1 | 1/2007 | Wong | | |
| 2007/0143837 A1 | 6/2007 | Azeez et al. | | |

(Continued)

OTHER PUBLICATIONS

U.S. Appl. No. 141523,654, filed Oct. 24, 2014, Eugene Michael Farrell.

(Continued)

*Primary Examiner* — Saleh Najjar
*Assistant Examiner* — Devin E Almeida
(74) *Attorney, Agent, or Firm* — Robert C. Kowert; Meyertons, Hood, Kivlin, Kowert & Goetzel, P.C.

(57) ABSTRACT

A computing system that provides virtual computing services may generate and manage remote computing sessions between client computing devices and virtual desktop instances hosted on the service provider's network. Each virtual desktop instance may include a network interface for communication between the virtual desktop instance and client computing devices, and a second interface that connects the virtual desktop instance to entities on other networks (e.g., Internet destinations, or shared resources on an internal network). An administrative component or client application may detect a condition indicating that the second interface should be disconnected or its operation modified in order to prevent or curtail malicious use of the virtual desktop instance, such as inactivity, server type activity or other suspicious activity, suspension or closing of a remote computing session, or a timeout condition, or may proactively disconnect the interface or modify its operation based on observed or expected usage patterns.

24 Claims, 10 Drawing Sheets

(56) References Cited

U.S. PATENT DOCUMENTS

| | | | |
|---|---|---|---|
| 2010/0195825 A1 | 8/2010 | Cini | |
| 2010/0322255 A1* | 12/2010 | Hao | G06F 9/45558 370/398 |
| 2011/0004680 A1 | 1/2011 | Ryman | |
| 2011/0283356 A1 | 11/2011 | Fly et al. | |
| 2012/0096271 A1 | 4/2012 | Ramarathinam et al. | |
| 2012/0110055 A1* | 5/2012 | Van Biljon | G06Q 30/04 709/201 |
| 2012/0110572 A1* | 5/2012 | Kodi | G06F 9/45558 718/1 |
| 2013/0024584 A1 | 1/2013 | Marcus | |
| 2013/0151706 A1 | 6/2013 | Henriquez et al. | |
| 2013/0311990 A1 | 11/2013 | Tang et al. | |
| 2013/0326072 A1* | 12/2013 | Smyth | H04L 67/141 709/227 |
| 2014/0258450 A1* | 9/2014 | Suryanarayanan | H04L 67/1097 709/217 |
| 2015/0154046 A1* | 6/2015 | Farkas | G06F 9/485 718/1 |

OTHER PUBLICATIONS

U.S. Appl. No. 13/928,283, filed Jun. 26, 2013, Deepak Suryanarayanan.

\* cited by examiner

US 10,075,459 B1

SECURING WORKSPACES IN A CLOUD COMPUTING ENVIRONMENT

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis.

Figure 1:
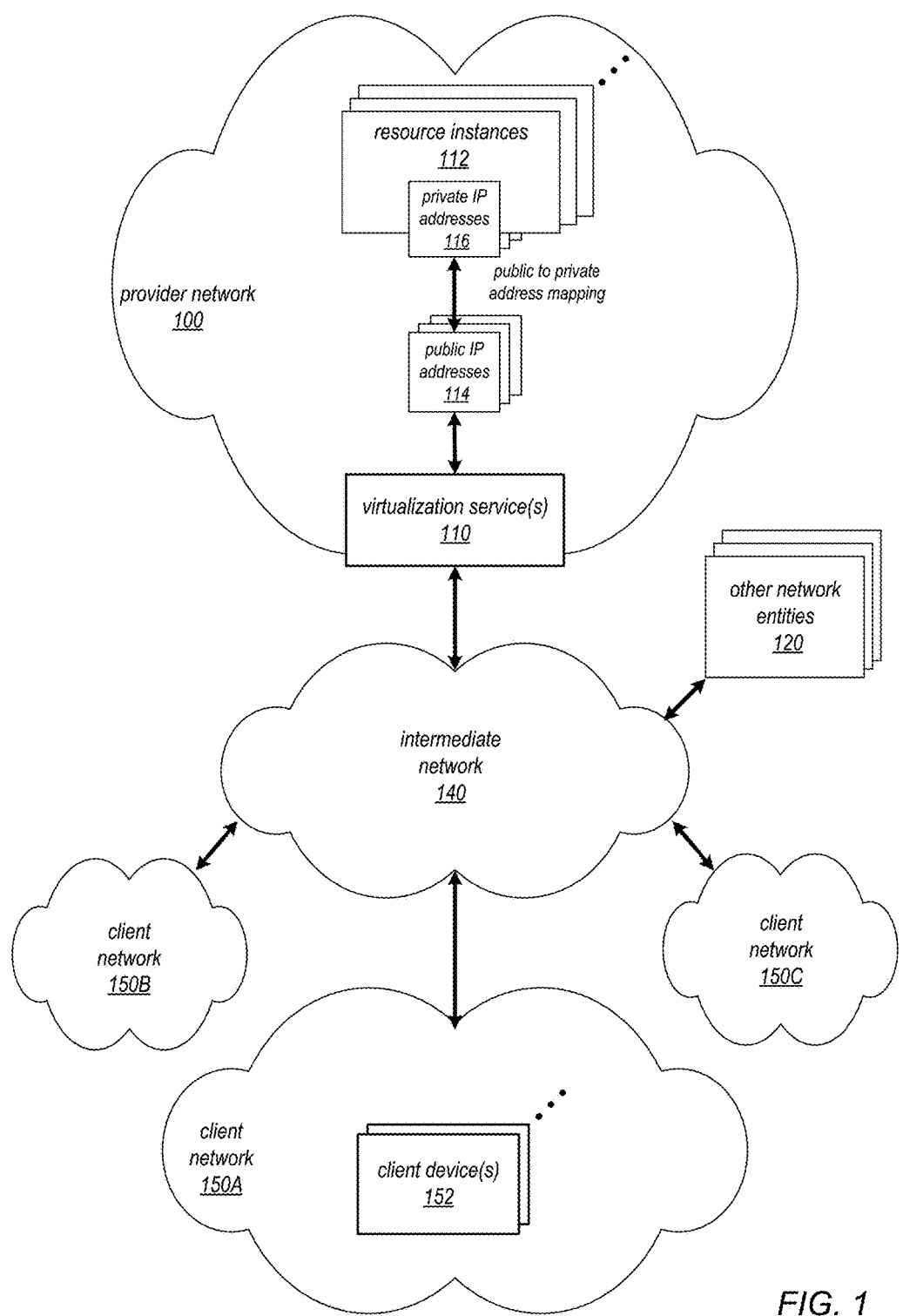
FIG. 1 is a block diagram illustrating an example provider network environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of systems and methods for securing workspaces (e.g., virtual desktop instances) in a system that provides virtualized computing resources to clients are described herein. Each virtual desktop instance may include two separate and distinct network interfaces. For example, a first network interface may be configured for communication between the virtual desktop instance and a client computing device, and a second network interface may be configured to connect the virtual desktop instance to one or more entities on another network (e.g., various Internet destinations, or shared resources on an internal network of an organization or enterprise on whose behalf the virtual desktop instance is instantiated). In some embodiments, the techniques described herein for securing virtual desktop instances may be used to avoid, prevent, detect, manage, and/or disable the use of virtual desktop instances for server workloads and/or for malicious purposes. In some embodiments, such abuses may be prevented or curtailed by dynamically managing the networking configuration of each virtual desktop instance (e.g., connecting and/or disconnecting the second network interface during operation, or by throttling, filtering, and/or redirecting at least some of the traffic on the second network interface during operation)

based on whether or not a user is actively connected to a workspace and/or on other criteria.

In some embodiments, an administrative component of the service provider network or a client application may detect one of a variety of pre-defined trigger conditions indicating that the second network interface should be disconnected or its operation modified to prevent or curtail the malicious use of the virtual desktop instance (e.g., a takeover of the virtual desktop instance by malware or the use of the virtual desktop instance as an unauthorized web server), and may disconnect or modify the operation of the second network interface (or cause it to be disconnected or its operation modified) in response. In various embodiments, the pre-defined trigger conditions may include inactivity, server type activity or other suspicious activity, suspension or closing of a remote computing session, or a timeout condition. In some embodiments, an administrative component of the service provider network or a client application may proactively disconnect or modify the operation of the second network interface based on observed or expected usage patterns. Note that the first network interface may or may not remain connected when conditions warrant the disconnection of modification of the second interface, in different embodiments. For example, in some embodiments, if malicious use of a virtual desktop instance is suspected, the second network interface may be disconnected or its operation modified but the virtual desktop instance may continue to communicate with a client device via the first network interface.

Figure 9:
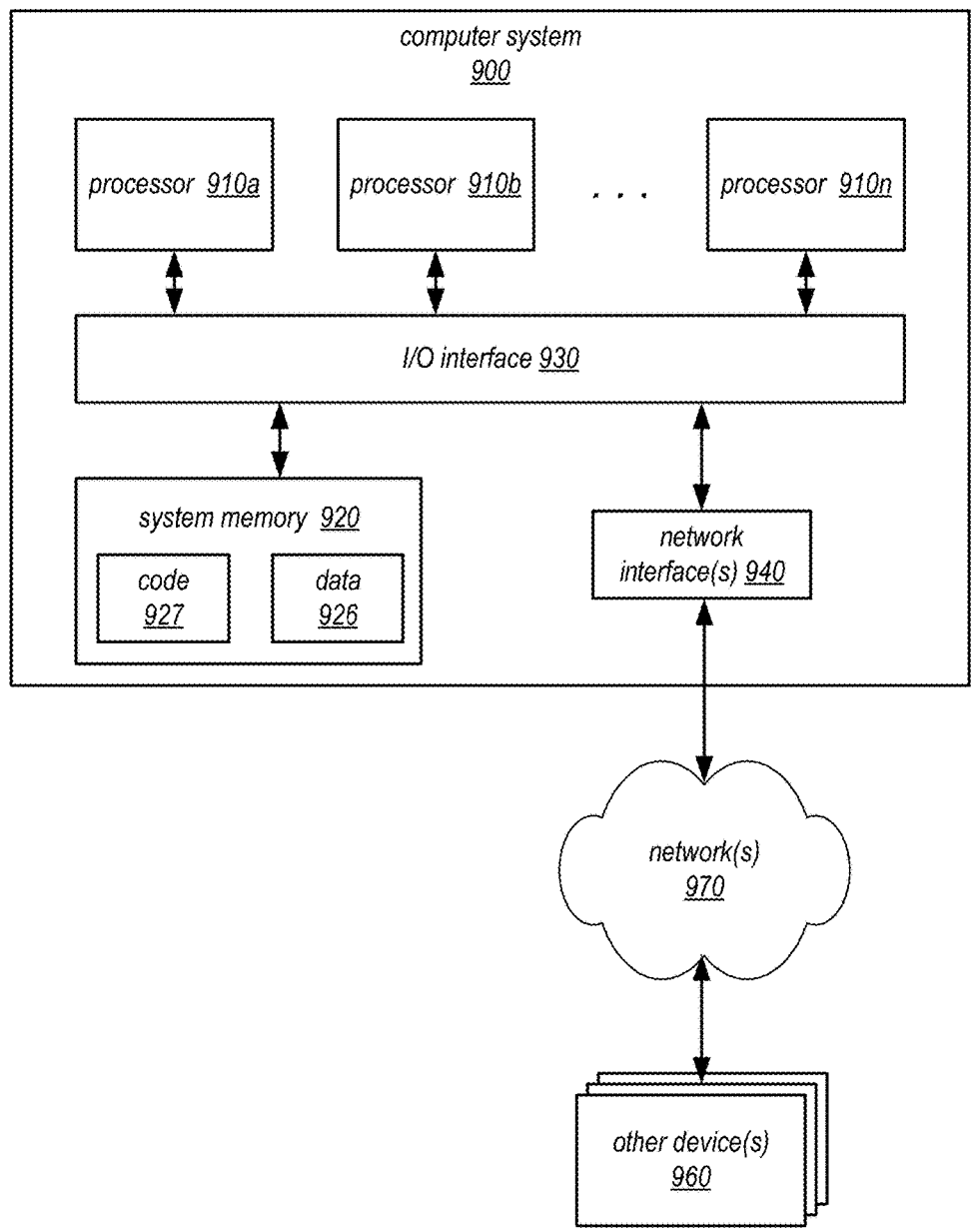
FIG. 9 is a block diagram illustrating an example computer system that implements some or all of the techniques described herein, according to different embodiments.

The systems and methods described herein may be implemented on or by one or more computing systems within a network environment, in different embodiments. An example computer system on which embodiments of the techniques for securing workspaces in a cloud computing environment described herein may be implemented is illustrated in FIG. 9. Embodiments of various systems and methods for implementing these techniques are generally described herein in the context of a service provider that provides to clients, via an intermediate network such as the Internet, virtualized resources (e.g., virtualized computing and storage resources) implemented on a provider network of the service provider. FIGS. 1-5 and 9 (and the corresponding descriptions thereof) illustrate and describe example environments in which embodiments of the systems and methods described herein may be implemented, and are not intended to be limiting. In at least some embodiments, at least some of the resources provided to clients of the service provider via the provider network may be virtualized computing resources implemented on multi-tenant hardware that is shared with other client(s) and/or on hardware dedicated to the particular client. Each virtualized computing resource may be referred to as a resource instance. Resource instances may, for example, be rented or leased to clients of the service provider. For example, clients of the service provider may access one or more services of the provider network via APIs to the services to obtain and configure resource instances and to establish and manage virtual network configurations that include the resource instances, for example virtualized private networks.

Figure 4:
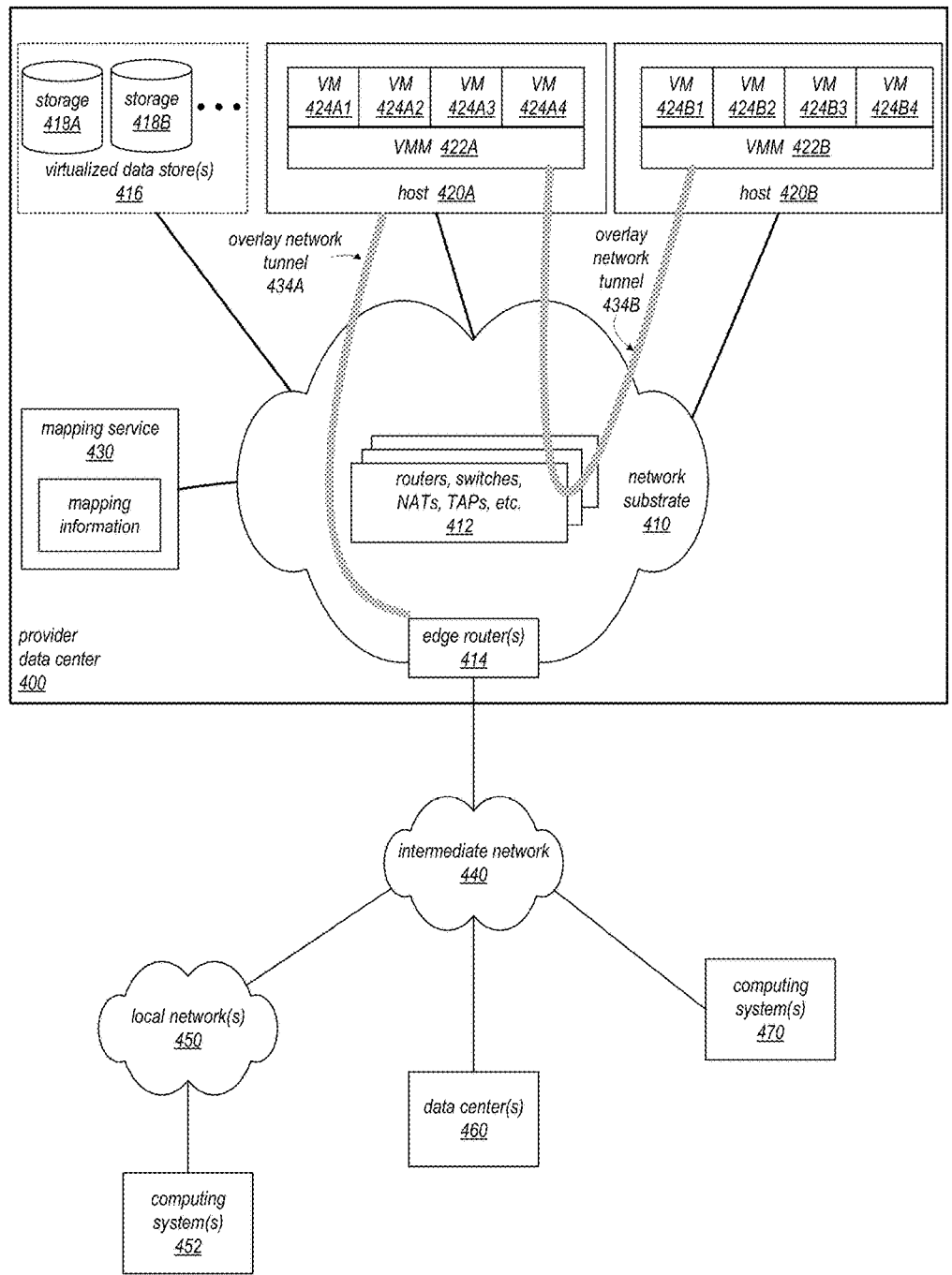
FIG. 4 is a block diagram illustrating an example service provider data center, according to at least some embodiments.

In some embodiments, the resource instances may, for example, be implemented according to hardware virtualization technology that enables multiple operating systems to run concurrently on a host computer, i.e. as virtual machines (VMs) on the hosts. A hypervisor, or virtual machine monitor (VMM), on a host may present the VMs on the host with a virtual platform and monitors the execution of the VMs. Each VM may be provided with one or more private IP addresses; the VMM on a host may be aware of the private IP addresses of the VMs on the host. An example of a system that employs such a hardware virtualization technology is illustrated in FIG. 4 and described in detail below.

Example Provider Network Environments

This section describes example provider network environments in which embodiments of the methods described herein may be implemented. However, these example provider network environments are not intended to be limiting. In various embodiments, in these provider network environments, a service provider may host virtualized resource instances on behalf of a customer that can be access by end users. For example, end users who are associated with the customer on whose behalf the virtualized resources instances are hosted (e.g., members of the same organization or enterprise) may be able to access the virtualized resources instances using client applications on client devices. In some embodiments, the virtualized resources instances may be configured to implement virtual desktop instances.

FIG. 1 illustrates an example provider network environment, according to at least some embodiments. A provider network 100 may provide resource virtualization to clients via one or more virtualization services 110 that allow clients to purchase, rent, or otherwise obtain instances 112 of virtualized resources, including but not limited to computation and storage resources, implemented on devices within the provider network or networks in one or more data centers. Private IP addresses 116 may be associated with the resource instances 112; the private IP addresses are the internal network addresses of the resource instances 112 on the provider network 100. In some embodiments, the provider network 100 may also provide public IP addresses 114 and/or public IP address ranges (e.g., Internet Protocol version 4 (IPv4) or Internet Protocol version 6 (IPv6) addresses) that clients may obtain from the provider 100.

Conventionally, the provider network 100, via the virtualization services 110, may allow a client of the service provider (e.g., a client that operates client network 150A, 150B, or 150C, each of which may include one or more client devices 152) to dynamically associate at least some public IP addresses 114 assigned or allocated to the client with particular resource instances 112 assigned to the client. The provider network 100 may also allow the client to remap a public IP address 114, previously mapped to one virtualized computing resource instance 112 allocated to the client, to another virtualized computing resource instance 112 that is also allocated to the client. For example, using the virtualized computing resource instances 112 and public IP addresses 114 provided by the service provider, a client of the service provider such as the operator of client network 150A may implement client-specific applications and present the client's applications on an intermediate network 140, such as the Internet. Other network entities 120 on the intermediate network 140 may then generate traffic to a destination public IP address 114 published by the client network 150A; the traffic is routed to the service provider data center, and at the data center is routed, via a network substrate, to the private IP address 116 of the virtualized computing resource instance 112 currently mapped to the destination public IP address 114. Similarly, response traffic from the virtualized computing resource instance 112 may be routed via the network substrate back onto the intermediate network 140 to the source entity 120.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 100; a client may then assign their allocated public IP addresses to particular resource instances allocated to the client. These public IP addresses may be referred to as client public IP addresses, or simply client IP addresses. Instead of being assigned by the provider network 100 to resource instances as in the case of standard IP addresses, client IP addresses may be assigned to resource instances by the clients, for example via an API provided by the service provider. Unlike standard IP addresses, client IP addresses may be allocated to client accounts and remapped to other resource instances by the respective clients as necessary or desired. In some embodiments, a client IP address is associated with a client's account, not a particular resource instance, and the client controls that IP address until the client chooses to release it. Unlike conventional static IP addresses, client IP addresses may allow the client to mask resource instance or availability zone failures by remapping the client's public IP addresses to any resource instance associated with the client's account. The client IP addresses, for example, may enable a client to engineer around problems with the client's resource instances or software by remapping client IP addresses to replacement resource instances.

Note also that in some embodiments, the resource instances 112 that are made available to clients (e.g., client devices 152) via virtualization service(s) 110 may include multiple network interfaces. For example, at least some of them may include one network interface for communicating with various components of a client network 150 and another network interface for communicating with resources or other network entities on another network that is external to provider network 100 (not shown).

Figure 2:
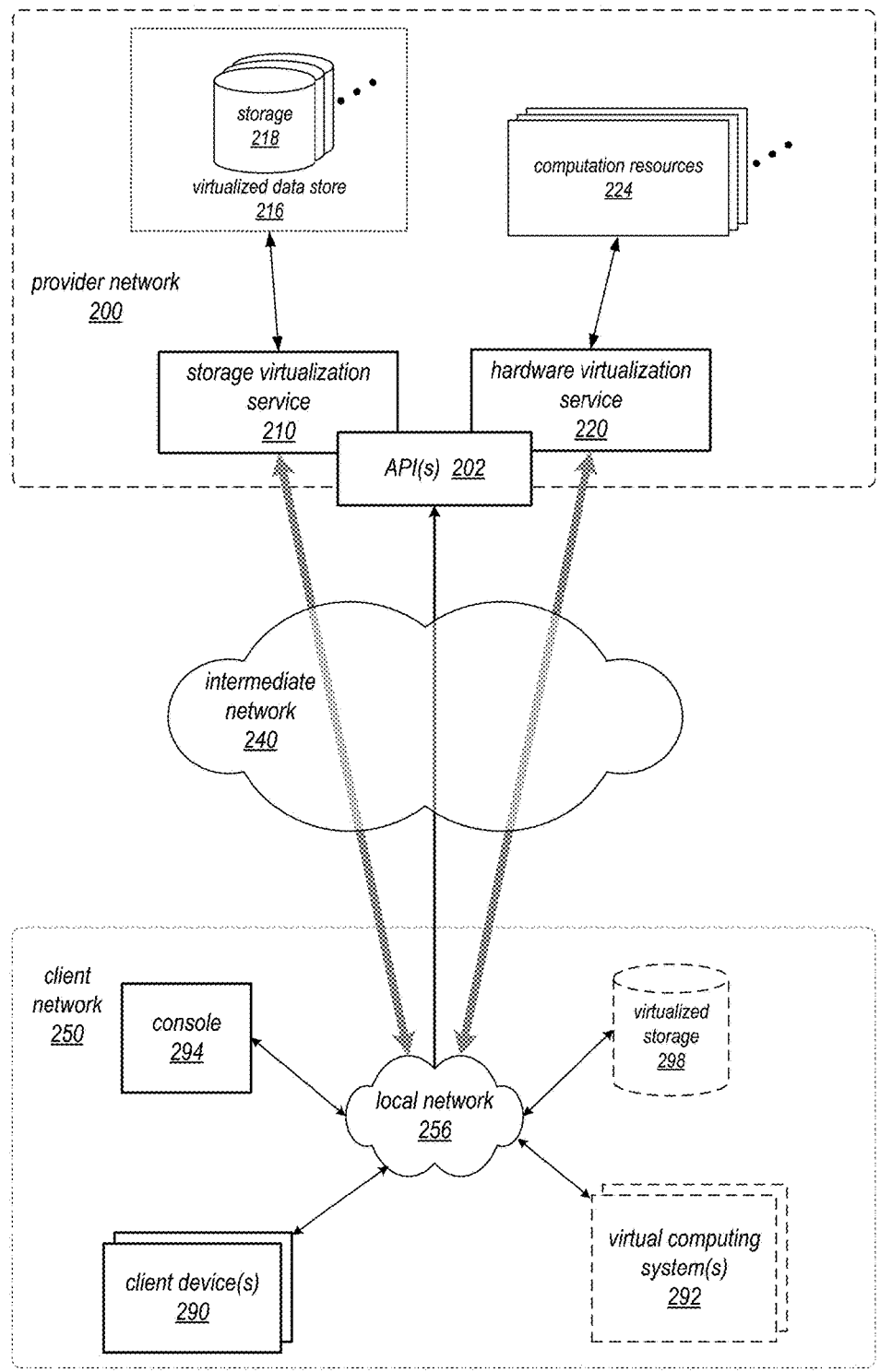
FIG. 2 is a block diagram illustrating an example provider network that provides a storage virtualization service and a hardware virtualization service to clients, according to at least some embodiments.

FIG. 2 is a block diagram of another example provider network environment, one that provides a storage virtualization service and a hardware virtualization service to clients, according to at least some embodiments. In this example, hardware virtualization service 220 provides multiple computation resources 224 (e.g., VMs) to clients. The computation resources 224 may, for example, be rented or leased to clients of the provider network 200 (e.g., to a client that implements client network 250). Each computation resource 224 may be provided with one or more private IP addresses. Provider network 200 may be configured to route packets from the private IP addresses of the computation resources 224 to public Internet destinations, and from public Internet sources to the computation resources 224.

Provider network 200 may provide a client network 250, for example coupled to intermediate network 240 via local network 256, the ability to implement virtual computing systems 292 via hardware virtualization service 220 coupled to intermediate network 240 and to provider network 200. In some embodiments, hardware virtualization service 220 may provide one or more APIs 202, for example a web services interface, via which a client network 250 may access functionality provided by the hardware virtualization service 220, for example via a console 294. In at least some embodiments, at the provider network 200, each virtual computing system 292 at client network 250 may correspond to a computation resource 224 that is leased, rented, or otherwise provided to client network 250.

From an instance of a virtual computing system 292 and/or another client device 290 or console 294, the client may access the functionality of storage virtualization service 210, for example via one or more APIs 202, to access data from and store data to a virtual data store 216 provided by the provider network 200. In some embodiments, a virtualized data store gateway (not shown) may be provided at the client network 250 that may locally cache at least some data, for example frequently accessed or critical data, and that may communicate with virtualized data store service 210 via one or more communications channels to upload new or modified data from a local cache so that the primary store of data (virtualized data store 216) is maintained. In at least some embodiments, a user, via a virtual computing system 292 and/or on another client device 290, may mount and access one or more storage volumes 218 of virtual data store 216, each of which appears to the user as local virtualized storage 298.

While not shown in FIG. 2, the virtualization service(s) may also be accessed from resource instances within the provider network 200 via API(s) 202. For example, a client, appliance service provider, or other entity may access a virtualization service from within a respective private network on the provider network 200 via an API 202 to request allocation of one or more resource instances within the private network or within another private network. Note that in some embodiments, the hardware virtualization service 220 may be configured to provide computation resources 224 that have been configured to implement a virtual desktop instance, which may appear to the user as a local desktop (implemented by a virtual computing system 292). Note also that in some embodiments, the computation resources 224 that are made available to the client via hardware virtualization service 220 may include multiple network interfaces. For example, at least some of them may include one network interface for communicating with various components of client network 250 and another network interface for communicating with computation resources or other network entities on another network that is external to provider network 200 (not shown).

In some embodiments, various components of a service provider network may be configured for the generation and management of remote computing sessions between client computing devices and virtual desktop instances hosted by one or more remote data center computers of a Program Execution Service (PES) platform. A number of data centers may be organized as part of a single PES platform that can facilitate the utilization of resources of the data centers by customers of the PES. In some embodiments, the PES may include several hundreds or thousands of data center computers. For example, in some embodiments, client computing devices may access the virtual desktop instances during one or more remote computing sessions, and a virtual desktop instance may provide a user with all of the capabilities of a client desktop environment but with centralized provisioning of the services accessed by the client.

In some embodiments, a user, via a client computing device, may transmit a request to load an application such as a remote computing application. Subsequent to the receipt of the request, the client computing device may communicate with a PES platform to start a remote computing session. In one embodiment, the communication between the client computing device and the PES platform may include login information. In other embodiments, the communication may also include information identifying resource usage information, processing requirements, or rules regarding the duration or conditions of the remote computing session for the user of the client computing device. The client computing device may further communicate various information relating to the device state, including, but not limited to, a current or future availability of device resources (e.g., processing power, memory, storage, network usage, etc.). Using the information received, the PES platform may identify one or more virtual desktop instances for execution in one or more remote computing sessions. In one example, the PES platform may instantiate, or cause to have instantiated, a virtual machine instance on a data center computer, and the virtual machine instance may include an operating system. The client computing device may then establish a remote computing session with the virtual machine, and the user interface of the operating system (e.g., the output of the operating system, such as a graphical user interface, sound, etc.) may be sent to the client computing device via a particular network interface of the virtual machine instance or virtual desktop instance and presented to the user (e.g., the graphical user interface may be rendered on a display of the client computing device). The operating system may use a desktop profile associated with the user and stored on a desktop store accessible by the PES to configure the virtual desktop instance for the user by setting the desktop background, screen saver, desktop layout, pointer preferences, sound settings, and the like. User input such as mouse and keyboard activity may then be sent to the virtual machine (via a particular network interface of the virtual machine instance or virtual desktop instance) and injected into the operating system as if the activity was performed by a user directly at the virtual machine.

In some embodiments, the PES platform may receive or generate data associated with the interaction of the client computing device with the virtual desktop instance on the client computing device during the remote computing session. The data may include user data and preferences, files, and the like. Upon receiving the data, the PES platform may save the data to the desktop store associated with the virtual desktop instance. In some embodiments, the desktop store may be implemented on a volume, or on another logical block storage device. In some embodiments, the PES may create a backup copy of the data or also store the data to a central repository. The saved data may then be used to restore remote computing sessions that have been interrupted due to a failure, such as a failure of the virtual desktop instance, the server hosting the virtual desktop instance, the network, etc. By saving the user data, the PES platform may ensure that the re-establishment of a remote computing session occurs with minimal delay and disruption to a user of a client computing device.

In some embodiments, the virtual desktop instance provided may be configured according to a user profile stored at a user profile store of the PES. The configuration of the virtual desktop instance may also be adjusted according to monitored usage of the instance. In some embodiments, the user profile may be set by an administrator associated with an entity governing the user's use. The user profile may indicate various memory and processing requirements associated with the PES computers executing the one or more virtual desktop instances as well as requirements for the virtual desktop instances. For example, the user profile may indicate the programs to which the user is given access while using the virtual desktop instance. The user profile may also indicate a maximum time or cost associated with the remote computing session. The PES may take a user profile for the user into consideration when placing and configuring the virtual desktop instances. In addition, placement and configuration decisions may also be adjusted based on a user's interaction with the virtual desktop over time.

Figure 3:
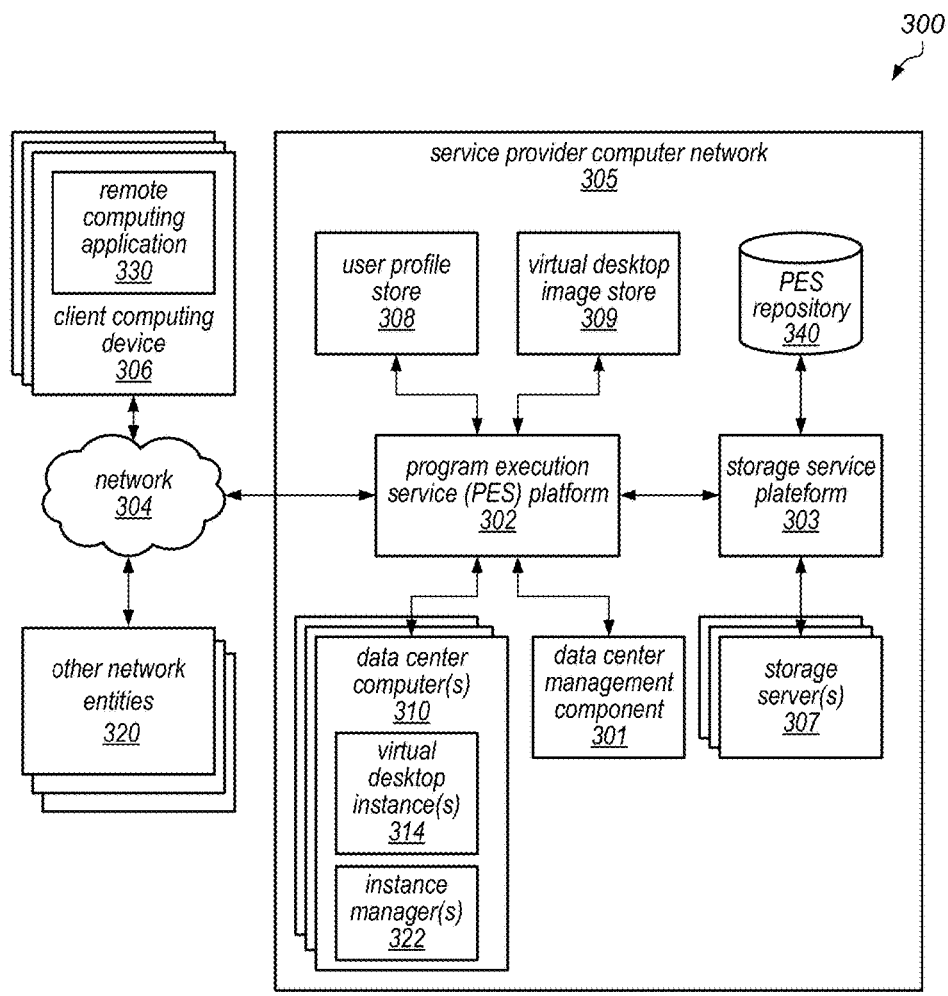
FIG. 3 is a block diagram illustrating a networked computing environment that includes a client computing device in communication with a service provider computer network, according to at least some embodiments.

FIG. 3 is a block diagram illustrating an example networked computing environment 300 that includes a client computing device 306 in communication with a service provider computer network 305 via the communication network 304. The client computing device 306 may be used for providing access to a remote operating system and applications to a user. In various embodiments, the client computing device 306 may correspond to a wide variety of computing devices including personal computing devices, laptop computing devices, hand-held computing devices, terminal computing devices, mobile devices (e.g., mobile phones, tablet computing devices, electronic book readers, etc.), wireless devices, various electronic devices and appliances, and the like. In some embodiments, the client computing device 306 includes necessary hardware and software components for establishing communications over a communication network 304, such as a wide area network or local area network. For example, the client computing device 306 may be equipped with networking equipment and browser software applications that facilitate communications via the Internet or an intranet. The client computing device 306 may have varied local computing resources such as central processing units and architectures, memory, mass storage, graphics processing units, communication network availability and bandwidth, etc.

In one embodiment, the client computing device 306 may run a remote computing application 330. The remote computing application 330 may request access to a virtual desktop instance hosted by the service provider computer network 305. The remote computing application 330 may also manage the remote computing session between the client computing device 306 and the service provider computer network 305. As illustrated in FIG. 3, the service provider computer network 305 may also include a PES platform 302. The PES platform 302 illustrated in FIG. 3 corresponds to a logical association of one or more data centers associated with a service provider. The PES platform 302 may be associated with a number of data center computers, such as, for example, data center computers 310. Each data center computer 310 may host one or more virtual desktop instances 314. For example, the data center computer 310 may host a virtual desktop instance by executing a virtual machine on a physical device. The virtual machine may execute an instance of an operating system and application software to create a virtual desktop instance. Each virtual desktop instance executed by the PES 302 may be accessed by one or more client computing devices, such as client computing device 306.

In some embodiments, data center computers 310 may be associated with private network addresses, such as IP addresses, within the service provider computer network 305 such that they may not be directly accessible by the client computing devices 306. The virtual desktop instances 314 may be associated with public network addresses that may be made available by a gateway at the edge of the service provider computer network 305. Accordingly, the virtual desktop instances 314 may be directly addressable by client computing devices 306 via the public network addresses. One skilled in the relevant art will appreciate that each data center computer 310 would include physical computing device resources and software to execute the multiple virtual desktop instances 314 or to dynamically instantiate virtual desktop instances 314. Such instantiations can be based on a specific request, such as from the client computing device 306.

As illustrated in FIG. 3, the data center computers 310 may include one or more instance managers 322. The instance managers 322 may be on the same computer as the respective instances 314, or on a separate computer. The instance managers 322 may track progress of the instances executed on the data center computers 310, monitor and coordinate the storage of data created by the user while interacting with the instances 314 via the client computing devices, and monitor the overall health and state of the data center computers 310 and of the remote computing applications running on the client computing devices 306. The instance managers 322 may communicate information collected through tracking and monitoring with the data center management component 301 of the PES platform 302 in order to efficiently manage the various remote computing sessions between the data center computers 310 and the client computing devices 306.

As illustrated in FIG. 3, the service provider network 305 may also include a storage service platform 303. The storage service platform 303 may include, or be connected to, one or more storage servers 307. The storage servers 307 may be used for storing data generated or utilized by the virtual desktop instances 314. The data generated or utilized by the virtual desktop instances 314 may be based on the interaction between the client computing devices 306 and the PES 302 via one or more remote computing sessions.

In some embodiments, the storage service platform 303 may logically organize and maintain information associated with a hosted virtual desktop instance 314 in a desktop store. The information associated with a virtual desktop instance 314 maintained in the desktop store may include, but is not limited to, user preferences, user or customer-specific policies, information associated with the execution of program data, user content, references to user content, and the like. For example, folders used by the user to store music, files, and the like on other storage devices, including through storage service providers, may also be mapped to the desktop store via references to those storage locations. That is to say, input/output operations, such as requests to open files in these folders, can be redirected to the desktop store. Thus, when a user attempts to open a file stored in his or her document folder, the request can be redirected by the operating system running in the virtual desktop instance to the desktop store. In addition to the data created by the user, the user's desktop profile, which may include, for example, configuration information for the desktop such as the background picture, fonts, arrangement of icons, and the like, may also be stored on the desktop store associated with the user's virtual desktop instance. In some embodiments, the service provider computer network 305 may be able to mitigate the effect of failures of the data center computer(s) 310 running the virtual desktop instances 314 or errors associated with the execution of virtual desktop instances 314 on the data center computer(s) 310 by storing data on storage servers independent from the data center computers 310. Additionally, the service provider network 305 may also facilitate client interaction with multiple virtual desktop instances 314 by maintaining the information in the desktop stores. In some embodiments, if one virtual desktop instance 314 fails, a new instance may be launched and attached to the same desktop store that was previously attached to the virtual desktop instance 314 that failed.

In various embodiments, the desktop stores may be distributed across multiple servers, they may be replicated for performance purposes on servers in different network areas, or they may be replicated across multiple servers with independent failure profiles for backup or fault performance purposes. For example, the servers may be attached to different power sources or cooling systems, the servers may be located in different rooms of a data center or in different data centers, and/or the servers may be attached to different routers or network switches. In some embodiments, a desktop store may be located on one storage server, and changes made to the desktop store may be replicated to another desktop store on a different storage server. Such replication may create a backup copy of the user's data. If the desktop store fails or the virtual desktop instance 314 loses its connection to the desktop store, the PES 302 may switch the connection of the virtual desktop instance 314 from the desktop store to the back-up desktop store.

As illustrated in FIG. 3, the PES platform 302 may also include a central storage device such as a PES repository 340 for storing data stored by the various desktop stores and backup stores on storage servers 307. The data center computers 310 and the storage servers 307 may further include additional software or hardware components that facilitate communications including, but not limited to, load balancing or load sharing software/hardware components for selecting instances of a virtual machine supporting a requested application and/or providing information to a DNS name server to facilitate request routing.

As illustrated in this example, the service provider computer network 305 may include a user profile store 308. The user profile store 308 may be used to store, for example, various programs a user is given access to while using a virtual desktop instance 314. The user profiles stored may also indicate a maximum time or cost associated with the remote computing sessions of different users. The PES platform 302 may take user profiles into consideration when placing, configuring, and/or managing virtual desktop instances 314. The PES platform 302 may also include, or be connected to, a virtual desktop image store 309. The virtual desktop image store 309 may include template images of operating systems without customizations applied per user profiles.

In some embodiments, data center computers 310 and storage servers 307 may be considered to be logically grouped, regardless of whether the components, or portions of the components, are physically separate. For example, a service provider computer network 305 may maintain separate locations for providing the virtual desktop instances 314 and the storage components. Additionally, although the data center computers 310 are illustrated in FIG. 3 as logically associated with a PES platform 302, the data center computers 310 may be geographically distributed in a manner to best serve various demographics of its users. Additionally, one skilled in the relevant art will appreciate that the service provider computer network 305 may be associated with various additional computing resources, such additional computing devices for administration of content and resources, and the like. For example, the service provider computer network 305 (and/or various ones of the virtual desktop instances 314 implemented thereon) may be configured to communicate with other network entities 320 over communication network 304 or over another communication network (e.g., at least some of the virtual desktop instances 314 may include a network interface usable to access one or more other network entities 320 that is separate and distinct from to a network interface that is usable to communicate with client computing device 306). These other network entities 320 may include, for example, other client networks or computing devices thereof, computing systems that provide resources for servicing requests received from client computing device 306, and/or networks or computing devices thereof that access other services, applications, or data over the Internet.

In some embodiments, the processing requirements associated with a user or a client computing device may be determined based on a variety of scenarios. In some embodiments, the determination may be based on a user request at launching of the remote computing application 330. For example, the user may be presented with a graphical user interface (GUI) displaying a variety of options for resources and applications. The user may then select the applications they wish to have access to, or, alternatively, the version of those applications. For example, one user may wish to access a basic version of an application while another user may wish to access a professional version of the same application. The determination may also be based on pre-selected options for certain users as determined by administrators of entities associated with the users. For example, the pre-selected options may be presented to the user as a list of different packages of applications to which the user may wish to have access. In some cases, the determination may be made on historical usage data of a user, which the PES platform 302 may determine once the request is received from the user.

In other cases, the determination of the processing requirements may be based on ongoing monitoring of use of processes by the user once the remote computing session is initiated. In such cases, the selection of adequate resource instances may be dynamically changed after the session is established, and the dynamic change over to new instance(s) may be performed as described with respect to FIG. 3 above. In some embodiments, the remote computing application 330 may request that a virtual desktop session be opened on behalf of the client, in response to which a virtual desktop instance 314 may be instantiated, configured for the use of the client, and/or connected to the client computing device 306 over network 304 (e.g., via one of two network interfaces of the virtual desktop instance 314).

In some embodiments, a service provider network that implements VMs and VMMs may use Internet Protocol (IP) tunneling technology to encapsulate and route client data packets over a network substrate between client resource instances on different hosts within the provider network. The provider network may include a physical network substrate that includes networking devices such as routers, switches, network address translators (NATs), and so on, as well as the physical connections among the devices. The provider network may employ IP tunneling technology to provide an overlay network via which encapsulated packets (that is, client packets that have been tagged with overlay network metadata including but not limited to overlay network address information for routing over the overlay network) may be passed through the network substrate via tunnels or overlay network routes. The IP tunneling technology may provide a mapping and encapsulating system for creating the overlay network on the network substrate, and may provide a separate namespace for the overlay network layer (public IP addresses) and the network substrate layer (private IP addresses). In at least some embodiments, encapsulated packets in the overlay network layer may be checked against a mapping directory to determine what their tunnel substrate target (private IP address) should be. The IP tunneling technology may provide a virtual network topology overlaid on the physical network substrate; the interfaces (e.g., service APIs) that are presented to clients are attached to the overlay network so that when a client resource instance provides an IP address to which packets are to be sent, the IP address is run in virtual space by communicating with a mapping service that can determine where the IP overlay addresses are. An example use of overlay network technology is illustrated in FIG. 4 and described in detail below.

In various embodiments, client resource instances on the hosts may communicate with other client resource instances on the same host or on different hosts according to stateful protocols such as Transmission Control Protocol (TCP) and/or according to stateless protocols such as User Datagram Protocol (UDP). However, the client packets are encapsulated according to an overlay network protocol by the sending VMM and unencapsulated by the receiving VMM. A VMM on a host, upon receiving a client packet (e.g., a TCP or UDP packet) from a client resource instance on the host and targeted at an IP address of another client resource instance, encapsulates or tags the client packet according to an overlay network (or IP tunneling) protocol and sends the encapsulated packet onto the overlay network for delivery. The encapsulated packet may then be routed to another VMM via the overlay network according to the IP tunneling technology. The other VMM strips the overlay network encapsulation from the packet and delivers the client packet (e.g., a TCP or UDP packet) to the appropriate VM on the host that implements the target client resource instance. In other words, in some embodiments, although there may be a single underlying physical network in the service provider computing environment (e.g., the service provider data center), the encapsulations described herein may allow it to appear as if each client application (or each client resource instance on which one or more client applications execute) is running on its own virtual network (e.g., data packets for multiple client applications may be traveling on the same physical network but it may appear as if the traffic directed to each of the client applications is traveling on a private network).

In some embodiments, the overlay network may be a stateless network implemented according to a connectionless (or stateless) IP protocol. In some such embodiments, the sending VMM sends the encapsulated packet onto the overlay network for routing and delivery, but does not receive an acknowledgement (ACK) or other response regarding delivery of the packet. In other embodiments, the VMM may receive an ACK or other response regarding delivery of an encapsulated packet.

FIG. 4 illustrates an example data center (e.g., one that implements an overlay network on a network substrate using IP tunneling technology), according to at least some embodiments. As illustrated in this example, a provider data center 400 may include a network substrate that includes networking devices 412 such as routers, switches, network address translators (NATs), and so on. At least some embodiments may employ an Internet Protocol (IP) tunneling technology to provide an overlay network via which encapsulated packets may be passed through network substrate 410 using tunnels. The IP tunneling technology may provide a mapping and encapsulating system for creating an overlay network on a network (e.g., a local network in data center 400 of FIG. 4) and may provide a separate namespace for the overlay layer (the public IP addresses) and the network substrate 410 layer (the private IP addresses). Packets in the overlay layer may be checked against a mapping directory (e.g., provided by mapping service 430) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 430) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 4, an example overlay network tunnel 434A from a virtual machine (VM) 424A on host 420A to a device on the intermediate network 440 (e.g., a computing system 470, a computing system 452 on local network 450, or a data center 46), and an example overlay network tunnel 434B between a VM 424B on host 420B and a VM 424A on host 420A are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

At least some networks in which embodiments of the techniques described herein for securing workspaces in a cloud computing environment may be implemented may include hardware virtualization technology that enables multiple operating systems to run concurrently on a host computer (e.g., hosts 420A and 420B of FIG. 4), i.e. as virtual machines (VMs) 424 on the hosts 420. The VMs 424 (some of which may be configured to implement a virtual desktop instance for the use of a client) may, for example, be rented or leased to clients of a network provider. A hypervisor, or virtual machine monitor (VMM) 422, on a host 420 may serve as an instance manager for the VMs 424 and/or other virtualized resource instances on the hosts 420, which may include presenting the VMs 424 on the host with a virtual platform and monitoring the execution of the VMs 424. Each VM 424 may be provided with one or more private IP addresses; the VMM 422 on a host 420 may be aware of the private IP addresses of the VMs 424 on the host. A mapping service 430 may be aware of all network IP prefixes and the IP addresses of routers or other devices serving IP addresses on the local network. This includes the IP addresses of the VMMs 422 serving multiple VMs 424. The mapping service 430 may be centralized, for example on a server system, or alternatively may be distributed among two or more server systems or other devices on the network. A network may, for example, use the mapping service technology and IP tunneling technology to, for example, route data packets between VMs 424 on different hosts 420 within the data center 400 network; note that an interior gateway protocol (IGP) may be used to exchange routing information within such a local network.

In addition, a network such as the provider data center 400 network (which is sometimes referred to as an autonomous system (AS)) may use the mapping service technology, IP tunneling technology, and routing service technology to route packets from the VMs 424 to Internet destinations, and from Internet sources to the VMs 424. Note that an external gateway protocol (EGP) or border gateway protocol (BGP) is typically used for Internet routing between sources and destinations on the Internet. FIG. 4 shows an example provider data center 400 implementing a network that provides resource virtualization technology and that provides full Internet access via edge router(s) 414 that connect to Internet transit providers, according to at least some embodiments. The provider data center 400 may, for example, provide clients the ability to implement virtual computing systems (VMs 424) via a hardware virtualization service (such as hardware virtualization service 220 in FIG. 2) and the ability to implement virtualized data stores 416 on storage resources 418 via a storage virtualization service (such as storage virtualization service 210 in FIG. 2).

In some embodiments, the data center 400 network may implement IP tunneling technology, mapping service technology, and a routing service technology to route traffic to and from virtualized resources, for example to route packets from the VMs 424 on hosts 420 in data center 400 to Internet destinations, and from Internet sources to the VMs 424. Internet sources and destinations may, for example, include computing systems 470 connected to the intermediate network 440 and computing systems 452 connected to local networks 450 that connect to the intermediate network 440 (e.g., via edge router(s) 414 that connect the network 450 to Internet transit providers). The provider data center 400 network may also route packets between resources in data center 400, for example from a VM 424 on a host 420 in data center 400 to other VMs 424 on the same host or on other hosts 420 in data center 400. In some embodiments, at least some of the VMs 424 may include two or more network interfaces. For example, they may include one network interface usable for communications between VMs 424 and the clients on whose behalf VMs 424 are hosted by the provider and a second (separate and distinct) network interface that is usable to access external resources, computing systems, data centers, or Internet destinations on networks other than the provider network and the client network, either or both of which may employ an IP tunneling technology, as described herein.

A service provider that provides data center 400 may also provide additional data center(s) 460 that include hardware virtualization technology similar to data center 400 and that may also be connected to intermediate network 440. Packets may be forwarded from data center 400 to other data centers 460, for example from a VM 424 on a host 420 in data center 400 to another VM on another host in another, similar data center 460, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 418, as virtualized resources to clients of a network provider in a similar manner.

Note that a public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network, or between a provider network and other network entities (e.g., external resources, computing systems, data centers, or Internet destinations on networks other than the provider network and the client network on whose behalf VMs 424 are hosted by the provider).

In some embodiments, while there are physical computers executing client applications and other processes described herein, the client applications may be running as virtual machines on the physical computers. For example, internal processes of the cloud computing environment that are configured to manage the creation of these virtual machines, to provision resources for these virtual machines, and/or to perform other administrative tasks on behalf of clients and/or their applications (e.g., monitoring resource usage, customer accounting, billing for services, etc.) may execute in a control plane layer (or hypervisor) in the cloud computing environment. By contrast, client applications (e.g., each resource instance that implements an application component) may execute in a data plane layer of the cloud computing environment. Underneath these layers, there may be only one physical network card for each host node (or for multiple host nodes), in some embodiments, but each resource instance may execute as if it has its own network (e.g., a virtual network). In some embodiments, each resource instance may have its own data plane network connection(s), but may make local API calls (e.g., calls to a component on the same node) without needing to rely on these data plane network connections.

In some embodiments, a customer may have an application running on a local machine, but may provision resources instances in a cloud computing environment to be used in case of a failure on the local machine. In some embodiments, multiple resource instances may be executing in a cloud computing environment to implement a distributed application on behalf of a client. In different embodiments, the cloud computing environment may be a multi-tenant environment in which each application (and/or each virtual private network) may have its own namespace. In some embodiments, each client may have its own allocation of network connectivity and/or throughput capacity (bandwidth). For example, the network connectivity and/or throughput capacity in the data plane network may be provisioned (e.g., designated or reserved) for the use of various clients.

Figure 5:
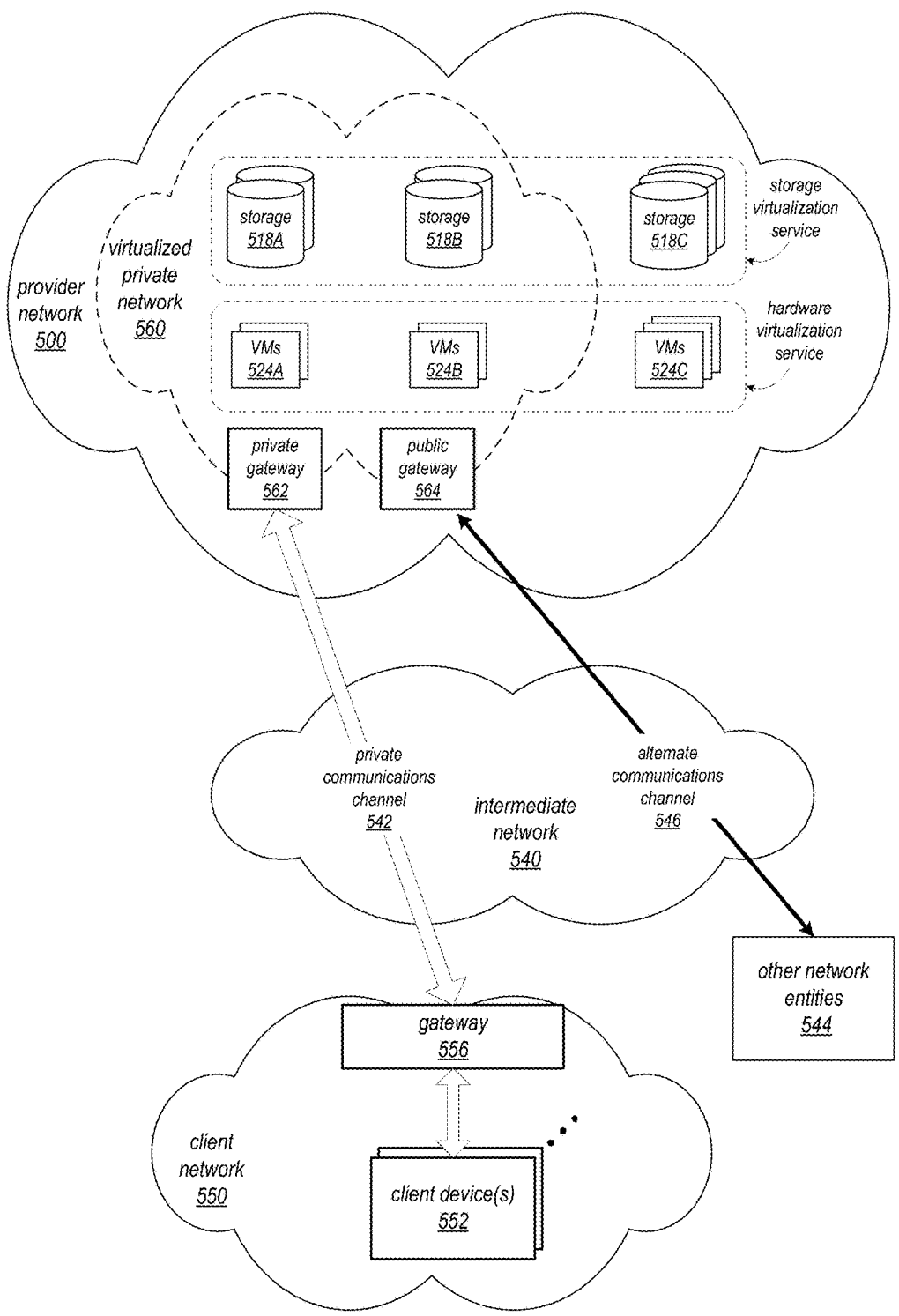
FIG. 5 is a block diagram illustrating an example provider network that provides private networks to clients, according to at least some embodiments.

FIG. 5 illustrates an example provider network that provides private networks on the provider network to at least some clients, according to at least some embodiments. A client's virtualized private network 560 on a provider network 500, for example, may enable a client to connect their existing infrastructure (e.g., client devices 552) on client network 550 to a set of logically isolated resource instances (e.g., VMs 524A and 524B and storage 518A and 518B), and to extend management capabilities such as security services, firewalls, and intrusion detection systems to include their resource instances.

In some embodiments, a client's virtualized private network 560 may be connected to a client network 550 via a private communications channel 542. A private communications channel 542 may, for example, be a tunnel implemented according to a network tunneling technology or some other peering connection over an intermediate network 540. The intermediate network may, for example, be a shared network or a public network such as the Internet. Alternatively, a private communications channel 542 may be implemented over a direct, dedicated connection between virtualized private network 560 and client network 550.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network.

To establish a virtualized private network 560 for a client on provider network 500, one or more resource instances (e.g., VMs 524A and 524B and storage 518A and 518B) may be allocated to the virtualized private network 560. Note that other resource instances (e.g., storage 518C and VMs 524C) may remain available on the provider network 500 for other client usage. A range of public IP addresses may also be allocated to the virtualized private network 560. In addition, one or more networking devices (routers, switches, etc.) of the provider network 500 may be allocated to the virtualized private network 560. A private communications channel 542 may be established between a private gateway 562 at virtualized private network 560 and a gateway 556 at client network 550.

In at least some embodiments, in addition to, or instead of, a private gateway 562, virtualized private network 560 may include a public gateway 564 that enables resources within virtualized private network 560 to communicate directly with entities (e.g., network entity 544) via intermediate network 540, and vice versa, instead of or in addition to via private communications channel 542.

In some embodiments, virtualized private network 560 may be, but is not necessarily, subdivided into two or more subnets (not shown). For example, in implementations that include both a private gateway 562 and a public gateway 564, the private network may be subdivided into a subnet that includes resources (VMs 524A and storage 518A, in this example) reachable through private gateway 562, and a subnet that includes resources (VMs 524B and storage 518B, in this example) reachable through public gateway 564. In other embodiments, one or more of the VMs 524 may be configured to access client network 550 over a private communications channel 542 through private gateway 562 (e.g., via a network interface that is configured for communication between the VM 524 and a client device 552) and to access other network entities 544 over an alternate communications channel 546 through public gateway 564 (e.g., via a network interface that is configured for communication between the VM 524 and external resources, computing systems, data centers, or Internet destinations on networks other than the provider network 500 and the client network 550, either or both of which may employ an IP tunneling technology, as described herein). In still other embodiments, private and/or public gateways and communication channels (including a private gateway 562, public gateway 564, private communications channel 542, alternate communications channel 546, and/or intermediate network 540) may be used in any of a variety of different combinations for communication between VMs 524, client network 550, and other network entities 544.

In some embodiments, the client may assign particular client public IP addresses to particular resource instances in virtualized private network 560. A network entity 544 on intermediate network 540 may then send traffic to a public IP address published by the client; the traffic is routed, by the provider network 500, to the associated resource instance. Return traffic from the resource instance may be routed, by the provider network 500, back to the network entity 544 over intermediate network 540. Note that routing traffic between a resource instance and a network entity 544 may require network address translation to translate between the public IP address and the private IP address of the resource instance.

At least some embodiments may allow a client to remap public IP addresses in a client's virtualized private network 560 as illustrated in FIG. 5 to devices on the client's external network 550. When a packet is received (e.g., from network entity 544), the network 500 may determine that the destination IP address indicated by the packet has been remapped to an endpoint on external network 550 and handle routing of the packet to the respective endpoint, either via private communications channel 542, alternate communications channel 546, or intermediate network 540. Response traffic may be routed from the endpoint to the network entity 544 through the provider network 500, or alternatively may be directly routed to the network entity 544 by the client network 550. From the perspective of the network entity 544, it may appear as if the network entity 544 is communicating with the public IP address of the client on the provider network 500. However, the network entity 544 may actually be communicating with the endpoint on client network 550.

While FIG. 5 shows network entity 544 on intermediate network 540 and external to provider network 500, in other embodiments, a network entity may be an entity on provider network 500. For example, one of the resource instances provided by provider network 500 may be a network entity that sends traffic to a public IP address published by the client. In some embodiments, this traffic may be sent via a network interface of a VM 524 that is separate and distinct from a network interface over which traffic between the VM 524 and client network 550 is sent.

Securing Virtual Desktop Instances

In various embodiments, a service provider may employ one of the example provider networks described above (or another suitable provider network environment) to implement a hosted desktop service in a cloud computing environment. In such embodiments, a customer may access the provider network in the cloud computing environment to request the instantiation and/or configuration of one or more virtual desktop instances in the cloud, and may then provide access to those virtual desktop instances to one or more end users (e.g., through a client application). For example, an administrator within an organization or enterprise may set up an account with a service provider, may contract with the service provider to set up some number of virtual desktop instances (which may also be referred to as "virtual workspaces" or simply "workspaces"), and (once the virtual desktop instances are set up), may provide credentials for accessing these virtual desktop instances. In this example, once the virtual desktop instances have been set up and credentials have been provided, one or more end users may launch a client application on their a client device (e.g., a computer, tablet device, or other mobile device) and enter the credentials for the virtual desktop instance, after which they may be logged into a virtual workspace environment. Although the virtual workspace environment is implemented by virtualized resource instances in the cloud computing environment, it may appear to the end user as if it were a local desktop and it may operate as if it were an independent computer to which the user is connected. In some embodiments, the virtual workspace environment may provide access to productivity software and other software programs to which the user would typically have access if the user were logged onto a physical computer owned by the organization or enterprise.

In some embodiments, these virtual workspaces may be intended to replace a desktop computer, e.g., they may be intended to run the same software programs that a member of the organization or enterprise on whose behalf they were instantiated and configured would access on a desktop computer in an office setting (e.g., applications that perform end-user productivity tasks). Note that these applications may or may not be stand-alone applications. For example, in some cases, each of the virtual workspaces (and/or the applications running thereon) may be part of the active directory framework of the organization or enterprise and may be able to access shared files or other resources on the existing network of the organization or enterprise once the credential presented by the user upon logging into the virtual workspace have been authenticated.

In some embodiments, the use of virtual workspaces for purposes other than end-use productivity tasks (e.g., for server workloads and/or for malicious purposes) may be discouraged or prohibited. For example, a virtual workspace could potentially be abused by a user that attempts to employ it as a production server (e.g., as a website host that streams a large amount of content out to other users). In another example, virtual workspaces could potentially be abused through a malicious takeover by a botnet or by another type of malware. In a specific example, a user could request the instantiation of multiple virtual workspaces and could subsequently configure them for use as part of a denial of service attack by pushing malicious code into each of the workspaces (e.g., using mechanisms that are intended for use by an administrator to push patches or updated applications to the workspaces for legitimate purposes) that submits a large number of requests to a particular Internet destination (e.g., a web service or web site). In another specific example, a user could configure an application running in a virtual workspace to function as a spam server.

In some embodiments, the techniques described herein for securing virtual desktop instances may be used to avoid, prevent, detect, manage, and/or disable the use of such virtual workspaces for server workloads and/or for malicious purposes. For example, in some embodiments such abuses may be prevented by managing the networking configuration of each virtual desktop instance based on whether or not a user is actively connected to a workspace and/or on other criteria. In some cases, this may include disconnecting a network interface of the virtual desktop instance, or throttling, filtering, and/or redirecting some or all of the traffic on a network interface of the virtual desktop instance in response to detecting one or more pre-defined trigger conditions. For example, a network interface of the virtual desktop instance may be disconnected or its operation modified while investigating the cause of the trigger condition to determine whether it is a result of malicious or unauthorized use of the virtual desktop instance and/or to mitigate the effects of malicious or unauthorized use of the virtual desktop instance until or unless it is shut down or a trigger condition is no longer met. In some embodiments, if it is determined that the trigger condition was not the result of malicious or unauthorized use of the virtual desktop instance or once a malicious or unauthorized use of the virtual desktop instance has been shut down, the network interface that was disconnected or modified may be re-attached and/or returned to its normal (or previous) operating conditions.

As previously noted, in some embodiments, each virtual desktop instance instantiated on a service provider network may include two (or more) network interfaces, each used for a specific purpose. In some embodiments, these virtual network interfaces may be controlled based on user intent and/or any of a variety of applicable policies (e.g., default policies of the service provider, customer-specific policies, or application-specific policies). One of the interfaces (sometimes referred to herein as the "E0" interface) may be configured to accept incoming end-user requests to start an interactive video stream. Once the request is accepted, this interface may be used as the interface for the video stream to the end user. For example, images depicting the user interface of an application or operating system executing on the virtual desktop instance (e.g., the output of the application or operating system such as a graphical user interface, sound, etc.) may be streamed to the client computing device and presented to the user (e.g., the images depicting the graphical user interface may be rendered on a display of the client computing device). The other network interface (sometimes referred to herein as the "E1" interface) may be used to send end-user web traffic (such as browser requests) from the virtual desktop instance to various Internet destinations and/or to connect to shared resources on the internal network of the organization or enterprise on whose behalf the virtual desktop instance was instantiated. For example, in some embodiments, the E1 interface of a virtual desktop instance may be part of a virtual private cloud (VPC) that has a connection to the internal network of the customer (e.g., the organization or enterprise on whose behalf the virtual desktop instances were instantiated). Thus, the virtual desktop instance may be joined to the customer's domain, and may have access to customer's web servers, including any shared applications and/or data. In some service provider environments, it is this second network interface (the E1 interface) that may potentially be exploited for malicious purposes.

In some embodiments, the first network interface of each virtual desktop instance (the E0 interface) may be completely controlled by the service provider. For example, in some embodiments, the only traffic allowed on that interface may be the video stream that is sent to the end user and traffic related to management functions that are under the control of the service provider. The second interface (the E1 interface) may not be used directly by the end user of the virtual desktop instance, but may provide a network connection for the virtualized computing resource instance that is hosting the virtual desktop instance that is separate from the connection used for the video stream and that allows the virtual desktop instance (or applications or processing executing thereon) to access other networks and network entities on other networks. In some embodiments, the E0 interface may be used to communicate the commands to launch a browser application on the virtual desktop instance, but the communications out to the Internet from that browser application may take place over the E1 interface.

In some embodiments, in response to detecting any of a variety of pre-defined trigger conditions (e.g., conditions that trigger disconnection of the E1 interface), the E1 interface of a virtual desktop instance may be dynamically and/or proactively shut down (e.g., detached, disconnected, or otherwise disabled) in order to prevent, block, or curtail malicious or unauthorized activity. In some embodiments, in response to detecting any of a variety of pre-defined trigger conditions (e.g., conditions that trigger modification of the operation of the E1 interface), the operation of the E1 interface of a virtual desktop instance may be dynamically and/or proactively modified. For example, some or all of the traffic that would normally be communicated via the E1 interface (e.g., traffic originating from or directed to particular resources, Internet destinations, or domains, or traffic of a particular type, such as server type traffic) may be throttled, redirected, and/or filtered, while other traffic may continue to be serviced (normally) via the E1 interface.

Note that, dependent on what the detected trigger condition is, the end user may continue to use the E0 interface to access the virtual desktop instance and to run applications on the virtual desktop instance after the E1 interface has been disconnected or its operation modified. However, if the E1 interface has been disconnected, neither the end user nor those applications will have access to the Internet or any resources on another network that were previously accessible via the E1 interface (e.g., shared resources on the internal network of the organization or enterprise on whose behalf the virtual desktop instance was instantiated) until or unless the E1 interface is subsequently re-connected. In this case, while the E1 interface is disconnected, the virtual desktop instance may operate as if it were a stand-alone desktop computer. Similarly, if the operation of the E1 interface is modified, the end user and those applications may or may not have access to the Internet or any resources on another network that were previously accessible via the E1 interface (e.g., shared resources on the internal network of the organization or enterprise on whose behalf the virtual desktop instance was instantiated), depending on whether the traffic between the virtual desktop instance and the Internet destinations or resources that are accessed by the end user or those applications has been throttled, redirected, and/or filtered as a result of the modification.

In some embodiments, using, and then subsequently disconnecting or modifying the operation of the E1 network interface of a virtual desktop instance may first include a user connecting to a virtual desktop instance by opening a client application, receiving a prompt to enter end-user credentials and entering the end-user credentials. The service provider may then accept the credentials and authenticate the end user. Once the end-user credentials are authenticated, the service provider (e.g., a hypervisor or instance manager thereof) may send a command to the networking control plane of the service provider network environment to attach the E1 interface of the virtual desktop instance (which may be an elastic network interface, or ENI, or another type of virtual network interface that can be shut off relatively quickly and easily under certain pre-defined conditions, in various embodiments). In addition, once the end-user credentials are authenticated, the service provider (e.g., a hypervisor or instance manager thereof) may enable the E0 interface (and the corresponding video stream), may prompt the user to connect to the virtual desktop instance, and may accept an incoming connection request from the user (e.g., through the client application). In response to the request, the service provider (e.g., a hypervisor or instance manager thereof) may record that a user session is now active and may also record the time at which the session was established. At this point the user is connected to the virtual desktop instance (workspace) through the client application and may communicate with the virtual desktop instance via the E0 network interface.

In this example, while the user session is active, the service provider (e.g., a hypervisor or instance manager thereof) may monitor the activity of the virtual desktop instance and/or its network interfaces during the user session to determine whether any of the pre-defined trigger conditions for disconnecting or modifying the operation of the E1 interface are met. In some embodiments, as long as the user session is active, the E1 interface may remain active. However, once the user session ends or the user disconnects from the virtual desktop instance, the connection to the E1 interface may be terminated. Note that, in this example, prior to an indication that the user intends to log into the virtual desktop service, the E1 network interface of the corresponding virtual desktop instance may be disconnected and network accesses through the E1 interface of that virtual desktop instance may be blocked. However, since the E1 interface is connected prior to the user connecting to the virtual desktop instance, once the user is connected to the virtual desktop instance through the E0 interface, the user may be able to access the Internet or any shared resources on the internal network of the organization or enterprise that are accessible via the E1 interface. In other embodiments, the E1 interface may not be connected to the virtual desktop instance by the service provider (e.g., a hypervisor or instance manager thereof) until and unless the user has connected to the virtual desktop interface via the E0 interface or until and unless the user explicitly requests access to the Internet or any shared resources on the internal network of the organization or enterprise that are accessible via the E1 interface.

In some embodiments, when and if the user disconnects from the workspace, the service provider may record that the session is now disconnected and may also record the time at which the session ended. For example, when the user disconnects from the workspace, the service provider may detect that this action has been completed (e.g., that user has logged out or suspended the client device through which they were connected to the workspace, such as by closing a laptop computer or quitting the client application), and may record that the user no longer has an active connection to the workspace. As noted above, once the service provider has detected that the user no longer has an active connection to the workspace, the service provider (e.g., a hypervisor or instance manager thereof) may be configured to disconnect the E1 interface, since there should be no need for that workspace to have connectivity to the Internet or any shared resources on the internal network of the organization or enterprise that are accessible via the E1 interface. For example, once the user session is disconnected or is no longer active, the service provider (e.g., a hypervisor or instance manager thereof) may send a command to the networking control plane of the service provider network environment to detach the E1 interface of the virtual desktop instance.

Figure 6A:
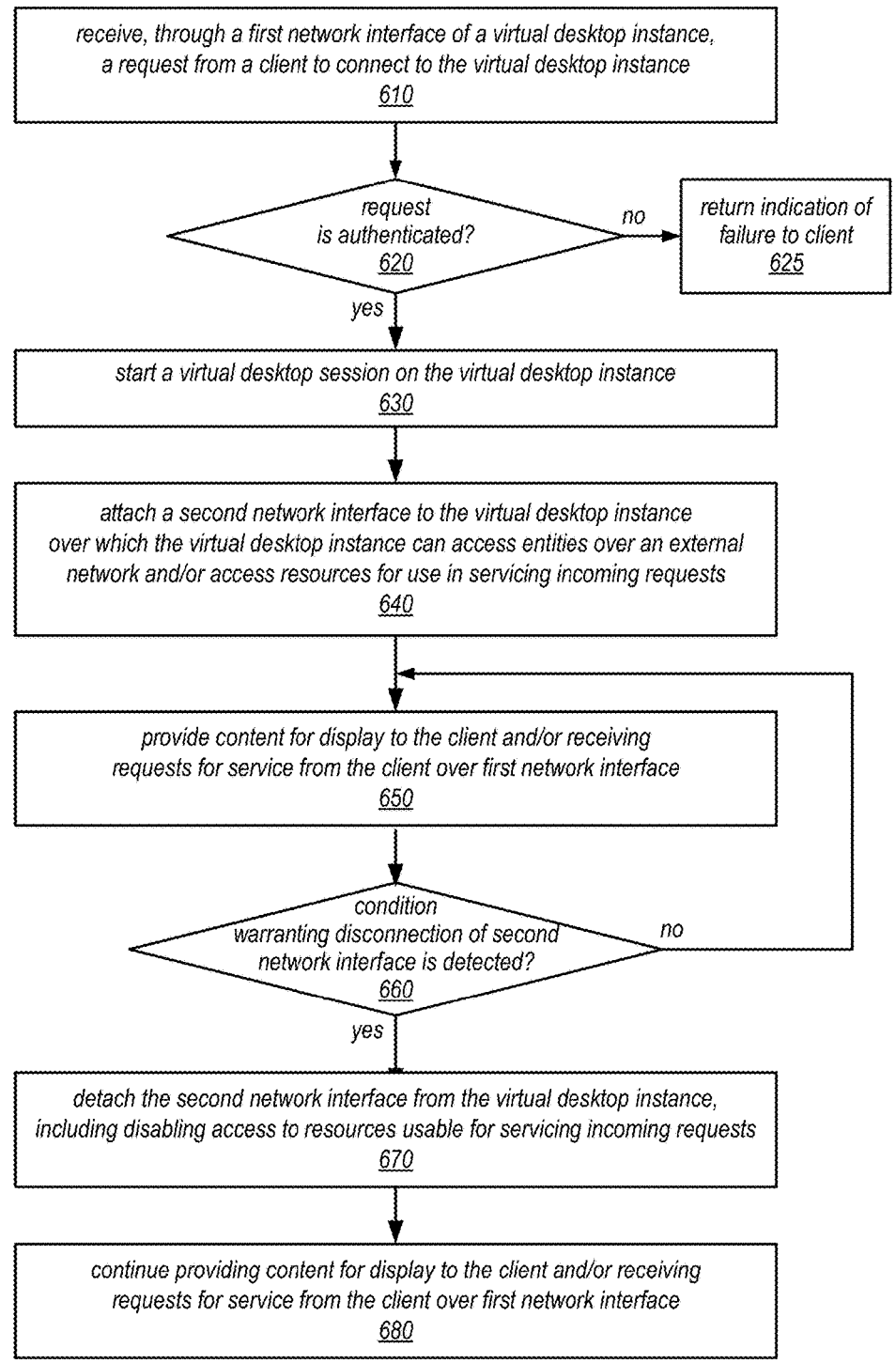
FIG. 6A is a flow diagram illustrating one embodiment of a method for securing a virtual desktop instance by disconnecting a network interface.

One embodiment of a method for securing a virtual desktop instance by disconnecting a network interface is illustrated by the flow diagram in FIG. 6A. As illustrated at 610, in this example, the method may include receiving, through a first network interface of a virtual desktop instance, a request from a client to connect to the virtual desktop instance. As described herein, in some embodiments, the request may include end-user credentials. If the request is not authenticated (shown as the negative exit from 620), the method may include returning an indication of the failure to authenticate the request to the client, as in 625. However, if the request is authenticated (shown as the positive exit from 620), the method may include starting a virtual desktop session on the virtual desktop instance, as in 630. As illustrated in this example, the method may include attaching a second network interface to the virtual desktop instance over which the virtual desktop instance can access entities over an external network and/or access resources for use in servicing incoming requests, as in 640.

As illustrated at 650, in FIG. 6A, the method may include providing content for display to the client and/or receiving requests for service from the client over the first network interface. If, during operation, none of the applicable pre-defined conditions warranting the disconnection of the second network interface is detected (shown as the negative exit from 660), the method may include continuing to operate until or unless such a condition is detected. This is illustrated in FIG. 6A by the feedback from the negative exit of 660 to 650. If, on the other hand, any of the applicable pre-defined trigger conditions warranting the disconnection of the second network interface is detected (shown as the positive exit from 660), the method may include detaching (e.g., disconnecting or otherwise disabling) the second network interface from the virtual desktop instance, as in 670. As illustrated at 680, in this example, following the disconnection of the second network interface, the method may include continuing to provide content for display to the client and/or receiving requests for service from the client over the first network interface. Note that detaching the second network interface may result in disabling access to resources (and/or Internet destinations) that would otherwise have been accessible or usable when servicing incoming requests. Note also that, in some embodiments, if it is determined that the trigger condition was not the result of malicious or unauthorized use of the virtual desktop instance or once a malicious or unauthorized use of the virtual desktop instance has been shut down, the second network interface may be re-attached and/or returned to its normal (or previous) operating conditions (not shown).

As previously noted, in some embodiments the systems described herein may not necessarily disconnect the second network interface of a virtual desktop instance in response to detecting a trigger condition that was defined for use in detecting, preventing, blocking, or curtailing malicious or unauthorized activity of the virtual desktop instance. Instead, for at least some of the pre-defined trigger conditions, these systems may be configured to mitigate the effects of a potentially malicious or unauthorized use of a virtual desktop instance by modifying the operation of the second network interface such that only a portion of the traffic on the second network interface (e.g., traffic that is related to the detected trigger condition or that is suspected of being involved in malicious or unauthorized activity) is affected.

Figure 6B:
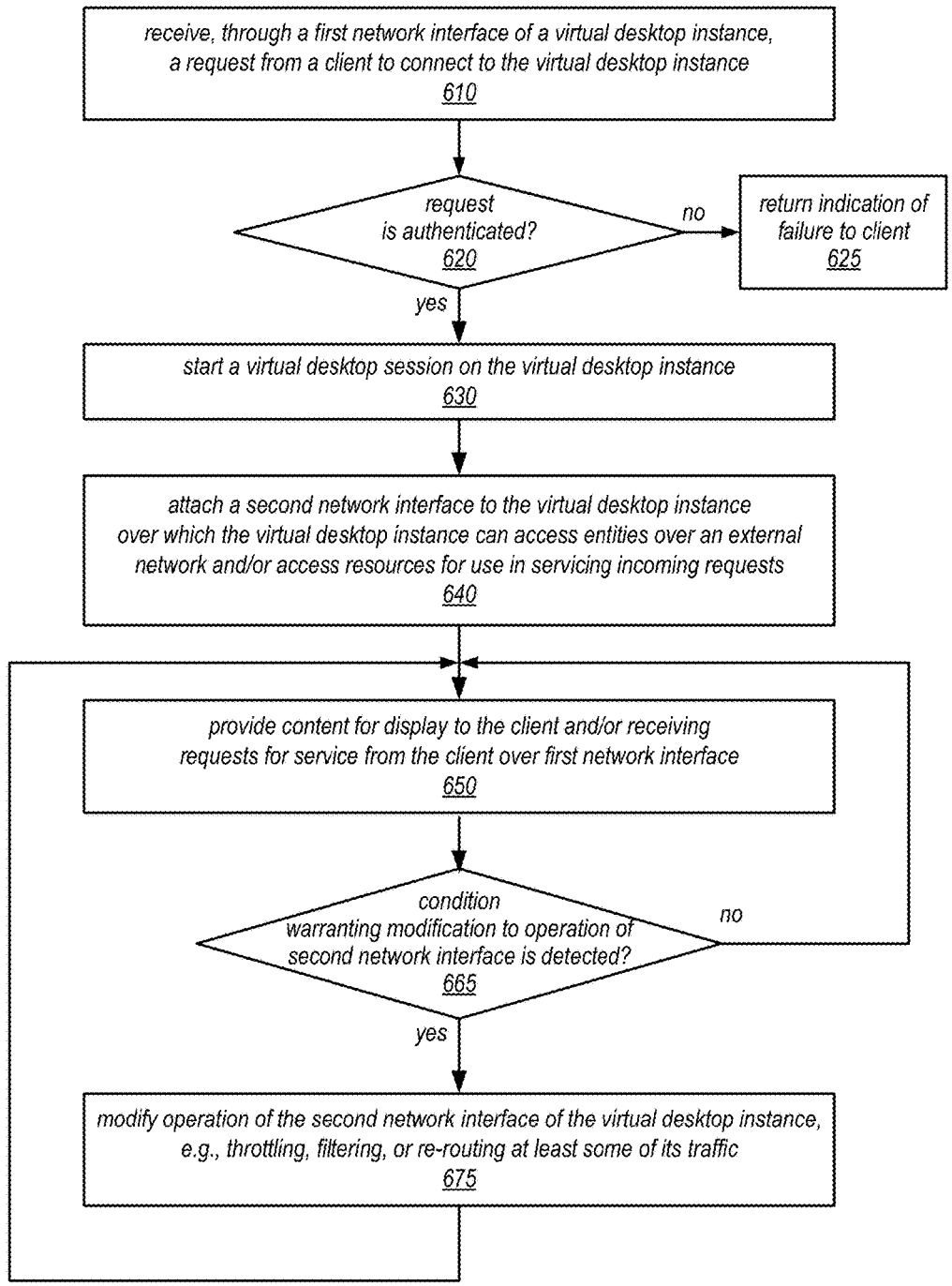
FIG. 6B is a flow diagram illustrating one embodiment of a method for securing a virtual desktop instance by modifying the operation of a network interface.

One embodiment of a method for securing a virtual desktop instance by modifying the operation of a network interface is illustrated by the flow diagram in FIG. 6B. As in the previous example, the method may include receiving, through a first network interface of a virtual desktop instance, a request from a client to connect to the virtual desktop instance (as in 610). As described herein, in some embodiments, the request may include end-user credentials. If the request is not authenticated (shown as the negative exit from 620), the method may include returning an indication of the failure to authenticate the request to the client, as in 625. However, if the request is authenticated (shown as the positive exit from 620), the method may include starting a virtual desktop session on the virtual desktop instance, as in 630. As illustrated in this example, the method may include attaching a second network interface to the virtual desktop instance over which the virtual desktop instance can access entities over an external network and/or access resources for use in servicing incoming requests, as in 640.

As illustrated at 650, in FIG. 6B, the method may include providing content for display to the client and/or receiving requests for service from the client over the first network interface. If, during operation, none of the applicable pre-defined conditions warranting the modification of the operation of the second network interface is detected (shown as the negative exit from 665), the method may include continuing to operate until or unless such a condition is detected. This is illustrated in FIG. 6B by the feedback from the negative exit of 665 to 650. If, on the other hand, any of the applicable pre-defined conditions warranting the modification of the operation of the second network interface is detected (shown as the positive exit from 665), the method may include modifying the operation of the second network interface from the virtual desktop instance (e.g., by throttling, filtering, or re-routing at least some of its traffic), as in 675. Note that throttling, filtering, or re-routing traffic on the second network interface may result in disabling or reducing access to some or all of the resources (and/or Internet destinations) that would otherwise have been accessible and usable when servicing incoming requests.

As illustrated in this example, following the modification of the operation of the second network interface of the virtual desktop instance, the method may include continuing to operate the virtual desktop instance according to the modified operating conditions of the second network interface. For example, in some embodiments the method may include continuing to provide content for display to the client and/or receiving requests for service from the client over the first network interface, and may also include accessing one or more network entities and/or resources over the second network interface (e.g., if this traffic has not been filtered out or redirected as a result of the modification). This is shown in FIG. 6B by the feedback from 675 to 650. Note that, in some embodiments, if it is determined that the trigger condition was not the result of malicious or unauthorized use of the virtual desktop instance or once a malicious or unauthorized use of the virtual desktop instance has been shut down, the second network interface may be returned to its normal (or previous) operating conditions (not shown).

In some embodiments, the systems described herein may include mechanisms for disconnecting the second network interface of a virtual desktop instance and may also include mechanisms for modifying the operation of the second network interface of a virtual desktop instance. In some such embodiments, a decision about whether to disconnect the second network interface or to modify its operation may be dependent, at least in part, on which of multiple potential trigger conditions has been met and/or detected. For example, some trigger conditions may be designated (by a user or policy) as conditions that warrant disconnection of the second network interface, while others may be designated as conditions that (at least initially) warrant modification of the second network interface. In some embodiments, after modifying the second network interface (e.g., in an attempt to curtail malicious or unauthorized activity or while investigating the cause of a detected trigger condition), if it appears that the virtual desktop instance may still be being used for malicious or unauthorized activity, the system may be configured to disconnect the second network interface.

In some embodiments, only enabling the second network interface (i.e., the E1 interface) when a user has an active connection to a virtual desktop instance may allow a virtual desktop service to prevent the instance being used as a production server. In addition, given that malware often relies on the user being logged off, this approach may also prevent the instance being used as part of a malicious botnet environment. In other words, as long as the virtual desktop service can dynamically detect whether or not user sessions are active (and/or other pre-defined conditions, such as those described herein), the service may be able to turn the network interfaces of various virtual desktop instances off or on. This may prevent the use of a virtual desktop instance for hosting a web server, since that web server would only be available while a user is logged into that workspace (e.g., when a user has an active connection to that workspace. Otherwise, the web server would not be available/reachable and would not respond to any service requests directed to it over the Internet or over other network to which the virtual desktop instance is connected via the E1 interface.

Figure 7:
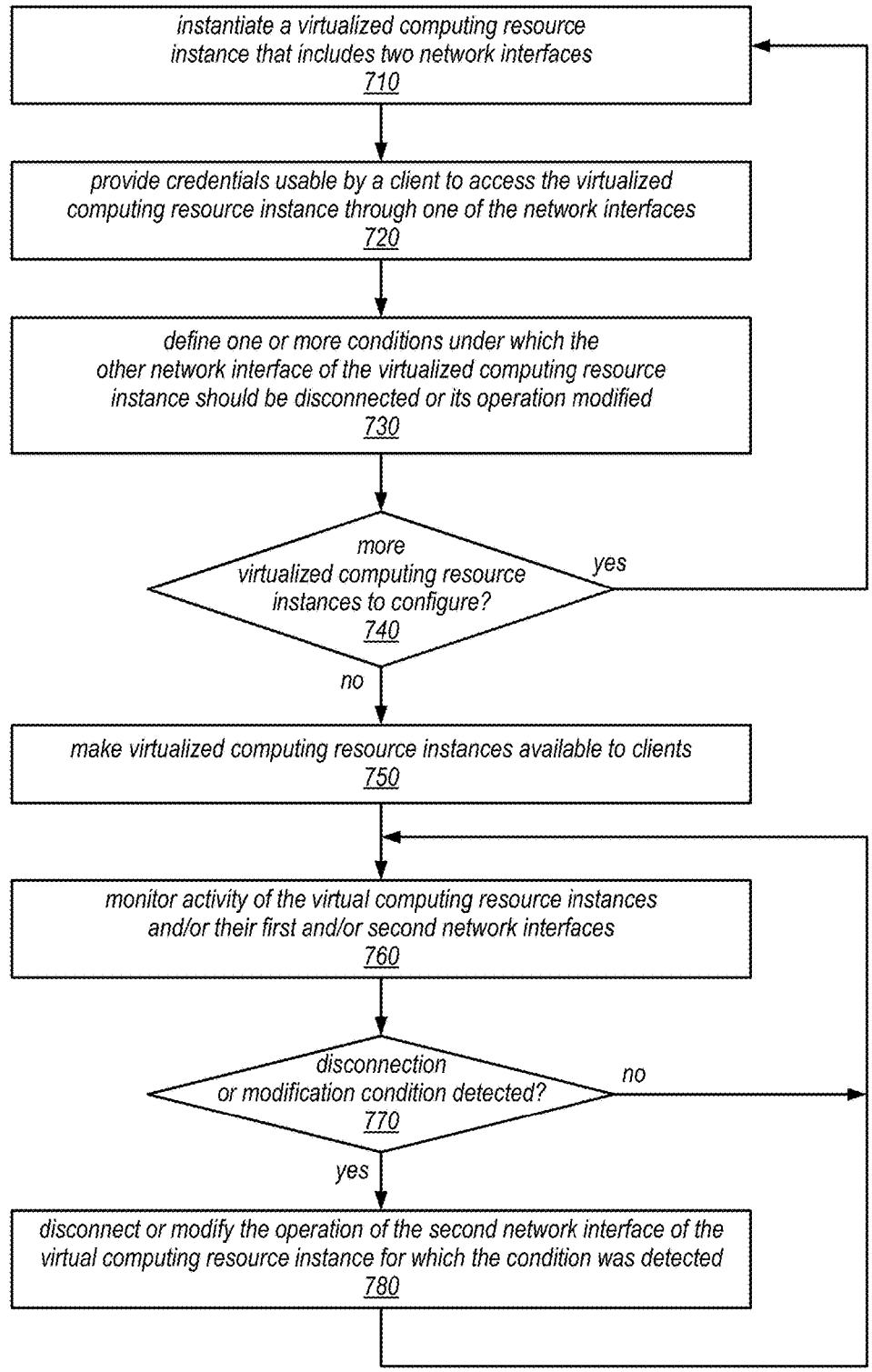
FIG. 7 is a flow diagram illustrating one embodiment of a method for providing virtual desktop instances or other virtualized computing resource instances to clients.

One embodiment of a method for providing virtual desktop instances or other virtualized computing resource instances to clients is illustrated by the flow diagram in FIG. 7. As illustrated in this example, a customer of a service provider may configure virtualized resources for the use of its clients (e.g., subscribers to a service may contract with the service provider to provide virtualized resources to employees of the same enterprise or members of the same organization). As illustrated at 710, the method may include instantiating a virtualized computing resource instance that includes two network interfaces, e.g., a first one through which data and/or service requests (or commands) can be communicated between a client and the virtualized computing resource instance, and a second one through which the virtualized computing resource instance can communicate with external network entities or other resources to satisfy incoming service requests (or commands).

The method may include providing credentials usable by a client to access the virtualized computing resource instance through one of the network interfaces, as in 720. The method may also include defining (or selecting from among multiple supported options) one or more conditions under which the other network interface of the virtualized computing resource (e.g., the one through which the virtualized computing resource instance communicates with external network entities or other resources) should be disconnected from those external network entities or other resources or its operation should be modified, as in 730. As described in more detail herein, in various embodiments, these trigger conditions may include one or more default conditions, system-wide policies, or customer-specific policies for determining when and if the other network interface should be disconnected or its operation modified.

If there are more virtualized computing resource instances to configure on behalf of the customer (shown as the positive exit from 740), the method may include repeating the operations illustrated in 710-730 for each additional one of the virtualized computing resource instances. This is shown in FIG. 7 as the feedback from the negative exit of 740 to 710. If there are no additional virtualized computing resource instances to configure on behalf of the customer, or once all of the additional virtualized computing resource instances have been configured on behalf of the customer (shown as the negative exit from 740), the method may include making the virtualized computing resource instances available to clients of the customer, as in 750.

As illustrated in this example, the method may include monitoring the activity of the virtualized computing resource instances along with their first and/or second network interfaces, as in 760. For example, this may include monitoring the traffic on the first and/or second network interfaces. Until and unless a trigger condition (e.g., a disconnection or modification condition) for the second network interface of one of the virtualized computing resource instances is detected, the method may include continuing to monitor the activity of the virtualized computing resource instances and their network interfaces. This is shown in FIG. 7 as the feedback from the negative exit of 770 to 760. However, if a disconnection or modification condition for the second network interface of one of the virtualized computing resource instances is detected (shown as the positive exit from 770), the method may include disconnecting the second network interface of the virtualized computing resource instance for which the disconnect condition was detected or modifying its operation, as in 780. As in the previous examples, disconnecting the second network interface of the virtualized computing resource instance may include blocking access by the virtualized computing resource instance to other resources and/or network entities, while modifying its operation may include throttling at least a portion of the traffic on the second network interface, filtering at least a portion of the traffic on the second network interface, or redirecting at least a portion of the traffic on the second network interface. As in previous examples, the method may include continuing to operate (e.g., to provide content for display to the client and/or receiving requests for service from the client over the first network interface and, unless the second network has been disconnected, accessing one or more network entities and/or resources over the second network interface). This is shown in FIG. 7 by the feedback from 780 to 760. Note that, in some embodiments, if it is determined that a detected trigger condition was not the result of malicious or unauthorized use of the virtualized computing resource instance or once a malicious or unauthorized use of the virtualized computing resource instance has been shut down, the second network interface may be returned to its normal (or previous) operating conditions (not shown).

As described herein, one condition that may trigger the disconnection of the second network interface (e.g., the E1 interface) of a virtual desktop instance is the determination that no user session has an active connection to the virtual desktop instance. In some embodiments, this approach may not totally prevent the use of the virtual desktop instance for malicious purposes, but may reduce the opportunity for the takeover of the virtual desktop instance by malicious software and/or may limit the time frame during which the virtual desktop instance (once taken over) can access the Internet or any shared resources on the internal network of the organization or enterprise that are accessible via the E1 interface. However, in other embodiments, more or different pre-determined conditions may trigger the disconnection or modification of the operation of the second network interface (e.g., the E1 interface) of a virtual desktop instance, as described in more detail below.

In some embodiments, a condition that could trigger the disconnection or modification of the operation of the E1 interface may be based on expected or observed usage patterns. In some such embodiments, a heuristic may be built over time based on the days and times during which one or more users are known to have been logged into the virtual desktop service, and the E1 interface may be proactively disconnected or its operation modified on days and/or at times during which the user or users are not typically logged in. In some such embodiments, the E1 interfaces of various virtual desktop instances may be proactively connected in anticipation of their use by a user. In this case, users may not be negatively impacted by not having the E1 interface immediately available for use which upon the establishment of a user session, but those virtual desktop instance may be prevented from being used for malicious purposes during the majority of the time that no user has an active connection to them. For example, in an organization or enterprise in which users typically access the virtual desktop service during standard business hours (e.g., logging into the service between 8-9 am on weekdays, and logging off between 5-7 pm on those days), the service may be configured to proactively connect the E1 interfaces of the virtual desktop instances that are provided on behalf of the organization or enterprise at 7 am and to proactively disconnect or modify the operation of those E1 interfaces at 8 pm. In this example, the malicious use of those virtual desktop instances may be prevented at least during the hours of 8 pm and 7 am on weekdays (and on weekends and holidays) without impacting the user experience of the users that only use the service during standard business hours.

In some embodiments, the virtual desktop services described herein may be configured to disconnect, modify, or disable the E1 interfaces of various virtual desktop instances based on other types of time windows. In one example, the E1 interfaces of various virtual desktop instances may be automatically disconnected or their operation modified outside of the standard business hours for a particular group of users or for a particular facility or location. In another example, the E1 interfaces of various virtual desktop instances may be disconnected or their operation modified when a timeout condition is met (e.g., a limit on the amount of time that a user session can be active or that an E1 interface can be connected). In some embodiments, these and other types of trigger conditions may be set up by an administrator of the organization or enterprise (e.g., they may be customer-specific or user-specific). In other embodiments, they may represent default conditions of the virtual desktop service.

In some embodiments, the service provider (e.g., a hypervisor or instance manager thereof) may be configured to detect malicious or suspicious behavior by virtual desktop instances and, in response, to automatically disconnect or modify the operation of the E1 interfaces of the virtual desktop instances on which the malicious or suspicious behavior was detected. In some embodiments, the service provider may be configured to detect an activity pattern that is indicative of the use of a virtual desktop instance to implement server type functionality, or to detect that the virtual desktop instance (or an application or process executing thereon) is repeatedly (and frequently) accessing a particular Internet destination or shared resource. For example, the service provider (or a hypervisor or instance manager thereof) may be configured to detect that ports are being opened on the security groups for one or more virtual desktop instances (on their E1 interfaces) and, in response, to disconnect, throttle, redirect, filter, detach or other otherwise block or modify accesses via their E1 network interfaces and return an error indication to the user(s) to let them know that this use case is not permitted. In some embodiments, an activity monitor of the service provider (or of a hypervisor or instance manager thereof) may be configured to disconnect or modify the operation of the E1 interfaces of various virtual desktop instances in response to detecting a period of inactivity on the E0 interface while use of the E1 interface is high, or in response to detecting a pattern of accesses via the E0 interface that appear to do nothing other than keep a timeout condition from being met.

In some embodiments, once a decision to disconnect or modify the operation of the E1 network interface of a particular virtual desktop instance based on one or more pre-defined disconnection conditions being met, a user may have to perform some action before the E1 network interface can be reconnected. For example, if an E1 interface is disconnected due to inactivity, but the user session on the virtual desktop instance is still active, the user may have to log out of the virtual desktop service and then log back into the virtual desktop service in order to reconnect the E1 interface. In some embodiments, a decision to disconnect or modify the operation of the E1 network interface of a particular virtual desktop instance based on one or more pre-defined disconnection conditions being met may be overridden by the service provider (or a hypervisor or instance manager thereof) if the service provider can determine that disconnection or modification is not warranted and/or in order to perform various administrative functions (e.g., while no user has an active connection). For example, in some organizations or enterprises, an administrator may be able to override a decision to disconnect the E1 interfaces of various virtual desktop instances (e.g., when no user has an active connection to them), or may be configured to reconnect those E1 interfaces (e.g., while no user has an active connection to them), in order to push patches or application updates to the virtual desktop instances over the E1 interfaces (after which they may be disconnected again). In another example, the service provider (or a hypervisor or instance manager thereof) or an administrator may be able disconnect the E1 interfaces of various virtual desktop instances (even when a user has an active connection to them and no pre-defined disconnection conditions are met), if keeping the E1 interfaces active is incompatible with the performance of an administrative task (e.g., a maintenance task) that is taking place (or needs to take place) in the virtual desktop service for a particular period of time. In some embodiments, the service provider may make commands for modifying, connecting and/or disconnecting the E1 interfaces of various virtual desktop instances available to an administrator of the organization or enterprise on whose behalf those virtual desktop instances were instantiated (e.g., a primary account holder for those virtual desktop instances).

In some embodiments, the service provider may provide a policy tool or other configuration mechanism through which an administrator of the organization or enterprise on whose behalf those virtual desktop instances were instantiated (e.g., a primary account holder for those virtual desktop instances) may define the rules or policies for monitoring their virtual desktop instances and/or the conditions that trigger the disconnection or modification of the operation of their E1 interfaces. Other rules or disconnection or modification of the operation of E1 interfaces may be defined and implemented by the service provider and may not be changed or overridden by a customer or user, in some embodiments.

As previously noted, in some embodiments, the E1 network interfaces of various virtual desktop instances may be used to access shared resources on the internal network of the organization or enterprise on whose behalf the virtual desktop instances were instantiated. In such embodiments, disconnecting or modifying the E1 interface of a particular virtual desktop instance may block or reduce access to those shared resources by the particular virtual desktop instance. In such embodiments, the service provider (or a hypervisor or instance manager thereof) may disconnect or modify the E1 interface in response to detecting suspicious behavior on the particular virtual desktop instance in order to isolate or quarantine the virtual desktop instance. In other embodiments, if the customer (e.g., an administrator of the organization or enterprise on whose behalf the virtual desktop instances were instantiated) detects suspicious accesses to shared resources and can track the source of those accesses back to an application or process running on a virtual desktop instance, the administrator may be able to issue a command or request to the service provider to disconnect or modify the operation of the E1 interface of that virtual desktop instance.

For example, in some embodiments, the systems described herein may be configured to filter traffic on the second network interface in order to block access to particular resources or network entities (e.g., those associated with the detected trigger condition or those that are unknown and/or untrusted resources or network entities), while allowing traffic between the virtual desktop instance and other resources and/or network instances (e.g., resources and network entities that are not associated with the detected trigger condition and/or that are behaving as expected, or resources and network entities that are known and/or trusted). In other embodiments, the systems described herein may be configured to throttle traffic received from or directed to particular resources or network entities (e.g., reducing the number of accesses to or from those resources or network entities in order to mitigate the effects of potentially malicious activity, such as a denial of service attack), but may allow traffic received from or directed to other resources or network entities to proceed normally. In still other embodiments, the systems described herein may be configured to redirect (e.g., re-route) traffic received from or directed to particular resources or network entities, but not others. For example, if a particular resource or network entity appears to be a source or target of a denial of service attack or of other malicious activity, traffic to or from that resource or network entity may be redirected (e.g., to a safe or controlled resource or network entity) in order to isolate the virtual desktop instance from the malicious activity while it is being investigated or until it can be curtailed.

Figure 8:
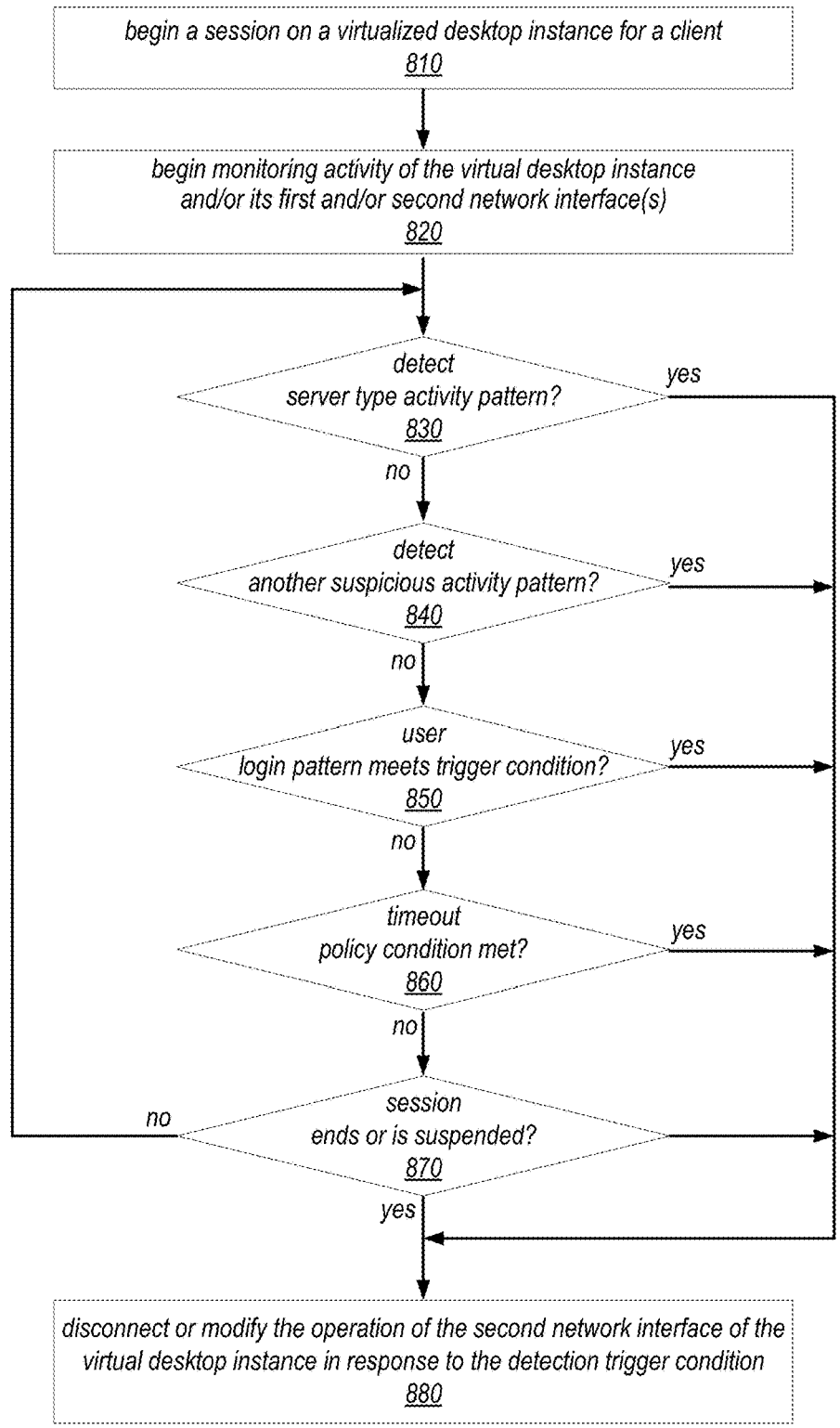
FIG. 8 is a flow diagram illustrating one embodiment of a method for determining when and if a network interface of a virtual desktop instance should be disconnected or its operation modified to avoid or prevent malicious use of the virtual desktop instance.

One embodiment of a method for determining when and if a network interface of a virtual desktop instance (e.g., a virtual desktop instance that includes two network interfaces of the types described herein) should be disconnected or its operation modified in order to avoid or prevent malicious use of the virtual desktop instance is illustrated by the flow diagram in FIG. 8. As illustrated in this example, the method may include beginning a virtual desktop session on a virtualized desktop instance for a client (as in 810), and beginning to monitor the activity of the virtual desktop instance along with its first and/or second network interface(s) (as in 820). If a server type activity pattern is detected (shown as the positive exit from 830), e.g., an activity pattern that is indicative of the use of the virtual desktop instance to implement server type functionality, the method may include disconnecting or modifying the operation of the second network interface of the virtual desktop instance, as in 880.

Similarly, if another type of suspicious activity pattern is detected (shown as the positive exit from 840), the method may include disconnecting or modifying the operation of the second network interface of the virtual desktop instance, as in 880. As illustrated in this example, other conditions that may result in disconnecting or modifying the operation of the second network interface of the virtual desktop instance (as in 880) may include determining that the second network interface should be disconnected or its operation modified according to a previously observed user login pattern (as in 850), or based on a timeout policy condition being met (as in 860). For example, it may be determined that the second network interface should be disconnected or its operation modified based on detecting inactivity of the virtual desktop instance (and/or either of its network interfaces) for a pre-determined time period, reaching a limit on the amount of time that a virtual desktop session can last, or reaching a limit on the amount of time that the second network connection can remain attached, in different embodiments.

As illustrated in this example, if it is determined that a virtual desktop session ends or is suspended (or that the first network interface, i.e., the network interface through which the virtual desktop instance communicates with clients, has been disconnected), the method may include disconnecting or modifying the operation of the second network interface of the virtual desktop instance (as in 880). However, until or unless any of these disconnection or modification conditions (or any other applicable trigger conditions that are not shown) are met, the method may include continuing to operate normally and monitoring the virtual desktop instance for potential disconnection or modification conditions. This is illustrated in FIG. 8 by the feedback from the negative exit of 870 to 830.

Note that, in various embodiments, some or all of the trigger conditions (e.g., disconnection and/or modification conditions) described herein may be determined, detected, and/or acted upon by a virtualized computing resource instance manager or by another administrative component of the service provider (e.g., a hypervisor, operating system component, or other privileged process). In other embodiments, some or all of the trigger conditions (e.g., disconnection and/or modification conditions) described herein may be determined, detected, and/or acted upon by a client application (e.g., one that detects a disconnection condition and then issues a request or command to the service provider to disconnect the appropriate network interface). As previously noted, some trigger conditions may warrant disconnection of a network interface, while others may warrant throttling, filtering, or re-routing at least some of its traffic (e.g., until the cause of the trigger conditions is investigated or until conditions change).

Note also that while several examples illustrated herein describe techniques for securing virtual desktop instances (workspaces) in a cloud computing environment, these techniques may be applied to secure other types of applications or processes in a virtual computing environment. In general, any system that provides virtualized computing resource instances for the use of clients (including, but not limited to, those that provide virtual desktop instances) may be configured to modify, detach, disconnect, or otherwise disable network interfaces that would otherwise be usable to connect virtualized computing resources to external network entities and/or other resources over a network other than one over which the virtualized computing resources communicate with clients, according to various rules, policies and/or conditions.

Illustrative System

In at least some embodiments, a server that implements some or all of the techniques for securing workspaces in a cloud computing environment as described herein may include a general-purpose computer system that includes or is configured to access a non-transitory computer-accessible (e.g., computer-readable) media, such as computer system 900 illustrated in FIG. 9. For example, in various embodiments, any or all of the computer system components described herein (including, e.g., data center computers and/or other components on a service provider network that collectively provide virtual computing services and/or virtual storage services, virtualized computing resource instances, virtual machines, virtual machine monitors or hypervisors, and/or virtual desktop instances; or client computing devices or other components on a client network) may be implemented using a computer system similar to computer system 900 that has been configured to provide the functionality of those components. In the illustrated embodiment, computer system 900 includes one or more processors 910 coupled to a system memory 920 via an input/output (I/O) interface 930. Computer system 900 further includes one or more network interfaces 940 coupled to I/O interface 930. In some embodiments, network interfaces 940 may include two or more network interfaces (including, e.g., one configured for communication between a virtualized computing resource hosted on the computer system 900 and its clients, and one configured for communication between a virtualized computing resource and external resources, computing systems, data centers, or Internet destinations on networks other than the provider network and a client network on whose behalf the virtualized computing resources are hosted.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for securing workspaces in a cloud computing environment, are shown stored within system memory 920 as code 925 and data 926.

In one embodiment, I/O interface 930 may be configured to coordinate I/O traffic between processor 910, system memory 920, and any peripheral devices in the device, including any of network interface(s) 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface(s) 940 may be configured to allow data to be exchanged between computer system 900 and other devices 960 attached to a network or networks 950, such as other computer systems or devices as illustrated in the figures, for example. In various embodiments, network interface(s) 940 may support communication via any suitable wired or wireless general data networks, such as types of Ethernet network, for example. Additionally, network interface(s) 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for implementing various embodiments of the techniques for securing workspaces in a cloud computing environment described herein. However, in other embodiments, program instructions and/or data may be received, sent or stored upon different types of computer-accessible media. Generally speaking, a computer-accessible (e.g., computer-readable) medium may include non-transitory storage media or memory media such as magnetic or optical media, e.g., disk or DVD/CD coupled to computer system 900 via I/O interface 930. A non-transitory computer-accessible (e.g., computer-readable) storage medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface(s) 940.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a plurality of computing nodes that collectively provide virtual computing services to one or more clients, each of the computing nodes comprising at least one processor and a memory;
   one or more virtualized computing resource instances, each executing on a respective one of the computing nodes; and
   a computing resource instance manager executing on at least one of the computing nodes;
   wherein one of the virtualized computing resource instances is configured to implement a virtual desktop instance, wherein the virtual desktop instance comprises two or more network interfaces;
   wherein, when connected, a first one of the network interfaces is configured to communicate information between the virtual desktop instance and a client over a network, and wherein, when connected, a second one of the network interfaces is configured to communicate information between the virtual desktop instance and a network entity other than the client over a second network other than the network over which information is communicated between the virtual desktop instance and the client;
   wherein, in response to the client presenting end-user credentials via the first network interface of the virtual desktop instance, the computing resource instance manager is configured to:
   authenticate the end-user credentials;
   begin a virtual desktop session of the virtual desktop instance on behalf of the client;
   connect the second interface of the virtual desktop application to the second network;
   observe a usage pattern of the virtual desktop instance, the usage pattern based at least in part on a comparison of traffic patterns of the first network interface and the second network interface;
   detect that a pre-defined trigger condition in the usage pattern has occurred on the virtual desktop instance; and
   in response to detecting the pre-defined trigger condition,
   determine a designation of the pre-defined trigger condition, wherein the designation indicates the pre-defined trigger condition warrants a particular operation of the second network interface,
   based on the designation indicating that the second network interface is to be disconnected, disconnect the second network interface of the virtual desktop instance from the second network, and based on the designation indicating that operation of the second network interface is to be modified, modify the operation of the second network interface.

2. The system of claim 1, wherein to detect the pre-defined trigger condition, the computing resource instance manager is configured to determine that the client has ended the virtual desktop session, suspended the virtual desktop session, or disconnected from the virtual desktop session.

3. The system of claim 1, wherein to detect the pre-defined trigger condition, the computing resource instance manager is configured to detect a suspicious activity pattern for the virtual desktop instance, and wherein the computing instance manager is further configured to:
  determine that the pre-defined trigger condition was not the result of a suspicious activity pattern; and
  in response to a determination that the pre-defined trigger was not the result of a suspicious activity pattern, restore the operation of the second network interface to a previous operating condition.

4. The system of claim 1, wherein to disconnect the second network interface of the virtual desktop instance, the computing resource instance manager is configured to disconnect the second network interface of the virtual desktop instance from the second network while the virtual desktop instance continues to communicate with the client over the first network interface, wherein disconnecting the second network interface from the second network comprises blocking access to other resources via the second network interface.

5. The system of claim 1, wherein to modify the operation of the second network interface, the computing resource instance manager is configured to throttle at least a portion of the traffic on the second network interface, filter at least a portion of the traffic on the second network interface, or redirect at least a portion of the traffic on the second network interface.

6. A method, comprising:
  performing, by one or more computers:
    receiving, from a client device via a network interface of a virtual desktop instance, one or more service requests;
    returning, to the client device via the network interface, content for display by the client device;
    accessing, via an additional network interface of the virtual desktop instance, a virtualized computing resource or network entity that is coupled to the virtual desktop instance over a different network than a network over which the virtual desktop instance communicates with the client device;
    determining, dependent at least in part on said accessing or on said receiving, that the virtual desktop instance meets a pre-defined trigger condition, wherein the pre-defined trigger condition is indicated in a usage pattern based at least in part on a comparison of traffic patterns of the first network interface and the second network interface;
    in response to said determining, identifying a designation of the pre-defined trigger condition, wherein the designation indicates the pre-defined trigger condition warrants a particular operation of the second network interface; and
    based on the designation indicating that the additional network interface is to be disconnected, disconnecting the additional network interface of the virtual desktop instance from the different network, or based on the designation indicating that operation of the additional network interface is to be modified, modifying the operation of the additional network interface.

7. The method of claim 6,
  wherein said accessing is performed in response to receiving the one or more service requests; and
  wherein the method further comprises, prior to said accessing:
    connecting the additional network interface of the virtual desktop instance to the different network.

8. The method of claim 6, further comprising:
  prior to receiving the one or more service requests:
    receiving, from the client via the network interface, a request to open a remote computing session on the virtual desktop instance; and
    opening a remote computing session on the virtual desktop instance for the client.

9. The method of claim 8, further comprising:
  prior to receiving the request to open a remote computing session:
    receiving, from a customer:
      a request to provide one or more virtual desktop instances to one or more clients; and
      credentials for subsequently accessing the one or more virtual desktop instances.

10. The method of claim 9, further comprising:
  in response to receiving the request to provide one or more virtual desktop instances and the credentials:
    configuring one or more virtualized computing resource instances to provide the one or more virtual desktop instances to the one or more clients, wherein said configuring is dependent, at least in part, on the received credentials; and
    connecting a network interface of at least one of the one or more virtual desktop instances to the network for use in communicating with the client device.

11. The method of claim 6, wherein said determining comprises detecting a period of inactivity on the network interface.

12. The method of claim 6, wherein said determining comprises determining that a timeout condition has been met or that the virtual desktop instance is operating outside of an expected window of time.

13. The method of claim 12, wherein the timeout condition or expected window of time is dependent on a standard or default policy applicable to the virtual desktop instance, a customer-specific policy, or a previously observed pattern of client behavior.

14. The method of claim 6, wherein said determining comprises:
  observing the usage pattern for the virtual desktop instance, wherein the usage pattern is further based at least in part on activity of the client with the virtual desktop instance and on an activity pattern of the virtual desktop instance; and
  detecting a suspicious activity pattern within the usage pattern.

15. The method of claim 14, wherein detecting the suspicious activity pattern comprises detecting an activity pattern in the usage pattern that is indicative of implementing server type functionality on the virtual desktop instance.

16. The method of claim 6, wherein said disconnecting comprises blocking access to one or more virtualized computing resources on the different network by the virtual desktop instance.

17. The method of claim 6, wherein said modifying comprises throttling at least a portion of the traffic on the additional network interface, filtering at least a portion of the traffic on the additional network interface, or redirecting at least a portion of the traffic on the additional network interface.

18. The method of claim 6, further comprising
after disconnecting or modifying the additional network interface, receiving, from the client device, a particular action; and
in response to receiving the particular action, reconnecting the additional network interface.

19. A non-transitory computer-readable storage medium storing program instructions that when executed on one or more computers cause the one or more computers to perform:
configuring a virtualized computing resource instance for use by a client that is connected to the virtualized computing resource instance over a given network, wherein said configuring comprises configuring the virtualized computing resource instance to service requests that are received from the client at a first network interface of the virtualized computing resource instance and to access another network entity coupled to the virtualized computing resource instance over another network through a second network interface of the virtualized computing resource instance;
monitoring a usage pattern of the virtualized computing resource instance, the usage pattern based at least in part on a comparison of traffic patterns of the first network interface and the second network interface;
determining, dependent at least in part on said monitoring, that a condition warranting disconnection of the second network interface of the virtualized computing resource instance or modification of the operation of the second network interface of the virtualized computing resource has been met in the usage pattern; and
in response to a determination that the condition has been met in the usage pattern, selectively disconnecting the second network interface of the virtualized computing resource instance from the other network or modifying the operation of the second network interface of the virtualized computing resource based on a designation of the condition, wherein the designation indicates that the condition warrants a particular configuration of the second network interface.

20. The non-transitory computer-readable storage medium of claim 19, wherein said configuring comprises configuring the virtualized computing resource instance to implement an application component on behalf of the client.

21. The non-transitory computer-readable storage medium of claim 19, wherein said determining comprises detecting suspicious activity by the virtualized computing resource instance over the other network, detecting disconnection of the first network interface of the virtualized computing resource instance from the given network, determining that a timeout condition has been met, or determining that the virtualized computing resource instance is operating outside of an expected window of time.

22. The non-transitory computer-readable storage medium of claim 19, wherein when executed on the one or more computers, the program instructions further cause the one or more computers to perform:
servicing a request that was received from the client at the first network interface of the virtualized computing resource instance; and
providing image content for display by the client over the given network via the first network interface of the virtualized computing resource instance.

23. The non-transitory computer-readable storage medium of claim 19,
wherein when executed on the one or more computers, the program instructions further cause the one or more computers to perform servicing a request that was received from the client at the first network interface of the virtualized computing resource instance; and
wherein said servicing comprises accessing one or more other computing resources over the other network through the second network interface of the virtualized computing resource instance.

24. The non-transitory computer-readable storage medium of claim 19, wherein said modifying comprises throttling at least a portion of the traffic on the second network interface, filtering at least a portion of the traffic on the second network interface, or redirecting at least a portion of the traffic on the second network interface.

* * * * *